United States Patent
Arora et al.

(10) Patent No.: US 12,210,360 B2
(45) Date of Patent: Jan. 28, 2025

(54) CONTROL OF AUTONOMOUS MOBILE ROBOTS

(71) Applicant: iRobot Corporation, Bedford, MA (US)

(72) Inventors: Shipra Arora, Arlington, VA (US); Michael Foster, Stoneham, MA (US); Frank Judge, Andover, MA (US); Brandon Rohrer, Boston, MA (US); Christopher Shumaker, Cambridge, MA (US); Matthew Weyant, Medford, MA (US); Alex Wong, Somerville, MA (US); Lauren D. Stern, Medford, MA (US)

(73) Assignee: iRobot Corporation, Bedford, MA (US)

( * ) Notice: Subject to any disclaimer, the term of this patent is extended or adjusted under 35 U.S.C. 154(b) by 43 days.

(21) Appl. No.: 17/934,782

(22) Filed: Sep. 23, 2022

(65) Prior Publication Data

US 2023/0015508 A1    Jan. 19, 2023

Related U.S. Application Data

(63) Continuation of application No. 16/794,855, filed on Feb. 19, 2020, now Pat. No. 11,467,585.
(Continued)

(51) Int. Cl.
  *G05D 1/648*    (2024.01)
  *G05D 1/00*    (2006.01)
  (Continued)

(52) U.S. Cl.
  CPC ......... *G05D 1/6482* (2024.01); *G05D 1/0214* (2013.01); *G05D 1/0274* (2013.01);
  (Continued)

(58) Field of Classification Search
  CPC . B25J 11/0085; G05D 1/0214; G05D 1/0238; G05D 1/0246–0257;
  (Continued)

(56) References Cited

U.S. PATENT DOCUMENTS 6,690,134 B1    2/2004  Jones et al.
8,386,081 B2    2/2013  Landry et al.
(Continued)

FOREIGN PATENT DOCUMENTS

CN    207804199    9/2018
EP    4117498    1/2023
(Continued)

OTHER PUBLICATIONS

[No Author Listed] "Neato All-Floor Robotic Vacuum User's Guide," Neato Robotics, 2011, 174 pages.
(Continued)

*Primary Examiner* — Spencer D Patton
(74) *Attorney, Agent, or Firm* — Fish & Richardson P.C.

(57) ABSTRACT

A method includes receiving sensor data collected by an autonomous mobile robot as the autonomous mobile robot moves about an environment, the sensor data being indicative of sensor events and locations associated with the sensor events. The method includes identifying a subset of the sensor events based on the locations. The method includes providing, to a user computing device, data indicative of a recommended behavior control zone in the environment, the recommended behavior control zone containing a subset of the locations associated with the subset of the sensor events. The method includes defining, in response to a user selection from the user computing device, a behavior control zone such that the autonomous mobile robot initiates a behavior
(Continued)

in response to encountering the behavior control zone, the behavior control zone being based on the recommended behavior control zone.

21 Claims, 14 Drawing Sheets

Related U.S. Application Data

(60) Provisional application No. 62/932,667, filed on Nov. 8, 2019.

(51) Int. Cl.
*G05D 1/223* (2024.01)
*G05D 1/224* (2024.01)

(52) U.S. Cl.
CPC ........... *G05D 1/223* (2024.01); *G05D 1/2246* (2024.01); *G05D 1/6485* (2024.01); *G05D 1/6486* (2024.01)

(58) Field of Classification Search
CPC ............... G05D 1/0044; G05D 1/0274; G05D 2201/0215; G05D 2201/0203; G05D 2201/0206; G05D 2201/0207; G05D 2201/0208; G05D 2201/0211; G05D 2201/0216; G05D 1/246–2469; G05D 1/648–6486; G05D 1/223; G05D 1/224; G05D 1/2246; A47L 11/4011
See application file for complete search history.

(56) References Cited

U.S. PATENT DOCUMENTS

| | | | |
|---|---|---|---|
| 9,026,302 B2 | 5/2015 | Stout et al. | |
| 9,554,508 B2 | 1/2017 | Balutis et al. | |
| 9,868,211 B2 | 1/2018 | Williams et al. | |
| 11,199,853 B1* | 12/2021 | Afrouzi | B25J 13/006 |
| 11,467,585 B2 | 10/2022 | Arora et al. | |
| 2010/0063628 A1 | 3/2010 | Landry et al. | |
| 2013/0211589 A1 | 8/2013 | Landry et al. | |
| 2015/0158174 A1* | 6/2015 | Romanov | A47L 11/4091 700/250 |
| 2016/0297072 A1* | 10/2016 | Williams | G05D 1/0274 |
| 2017/0203446 A1 | 7/2017 | Dooley et al. | |
| 2018/0049613 A1* | 2/2018 | Tsuboi | A47L 9/2805 |
| 2018/0050634 A1 | 2/2018 | White et al. | |
| 2018/0074508 A1 | 3/2018 | Kleiner et al. | |
| 2018/0284792 A1* | 10/2018 | Kleiner | G05D 1/0274 |
| 2018/0292832 A1 | 10/2018 | Bae et al. | |
| 2019/0204851 A1* | 7/2019 | Afrouzi | A47L 9/0405 |
| 2019/0213438 A1 | 7/2019 | Jones et al. | |
| 2019/0250625 A1 | 8/2019 | Kleiner et al. | |
| 2020/0345191 A1 | 11/2020 | Furuta et al. | |
| 2020/0401153 A1 | 12/2020 | Sui et al. | |
| 2021/0055736 A1* | 2/2021 | Han | G05D 1/0217 |
| 2021/0138659 A1 | 5/2021 | Arora et al. | |
| 2021/0200236 A1* | 7/2021 | Lindhe | G05D 1/246 |
| 2022/0287531 A1* | 9/2022 | Ng | G06Q 10/0631 |

FOREIGN PATENT DOCUMENTS

| | | |
|---|---|---|
| JP | 2004-195215 | 7/2004 |
| JP | 2019-532369 | 11/2019 |
| JP | 2020-535496 | 12/2020 |
| WO | WO 2019/097626 | 5/2019 |
| WO | WO 2021/183247 | 9/2021 |

OTHER PUBLICATIONS

Ecovacs.cn [online] "DN33 tips," retrieved on Jun. 17, 2019, retrieved from URL <https://www.ecovacs.cn/deebot/dn33/use-tips-4.html>.
International Preliminary Report on Patentability in International Appln. No. PCT/US2020/044620, dated May 19, 2022, 8 pages.
International Search Report and Written Opinion in International Appln. No. PCT/US2020/044620, dated Oct. 23, 2020, 9 pages.
International Search Report and Written Opinion in International Appln. No. PCT/US2020/26183, dated Jun. 29, 2020, 13 pages.
Extended European Search Report in European Appln. No. 20885547.8, mailed on Oct. 24, 2023, 8 pages.

* cited by examiner

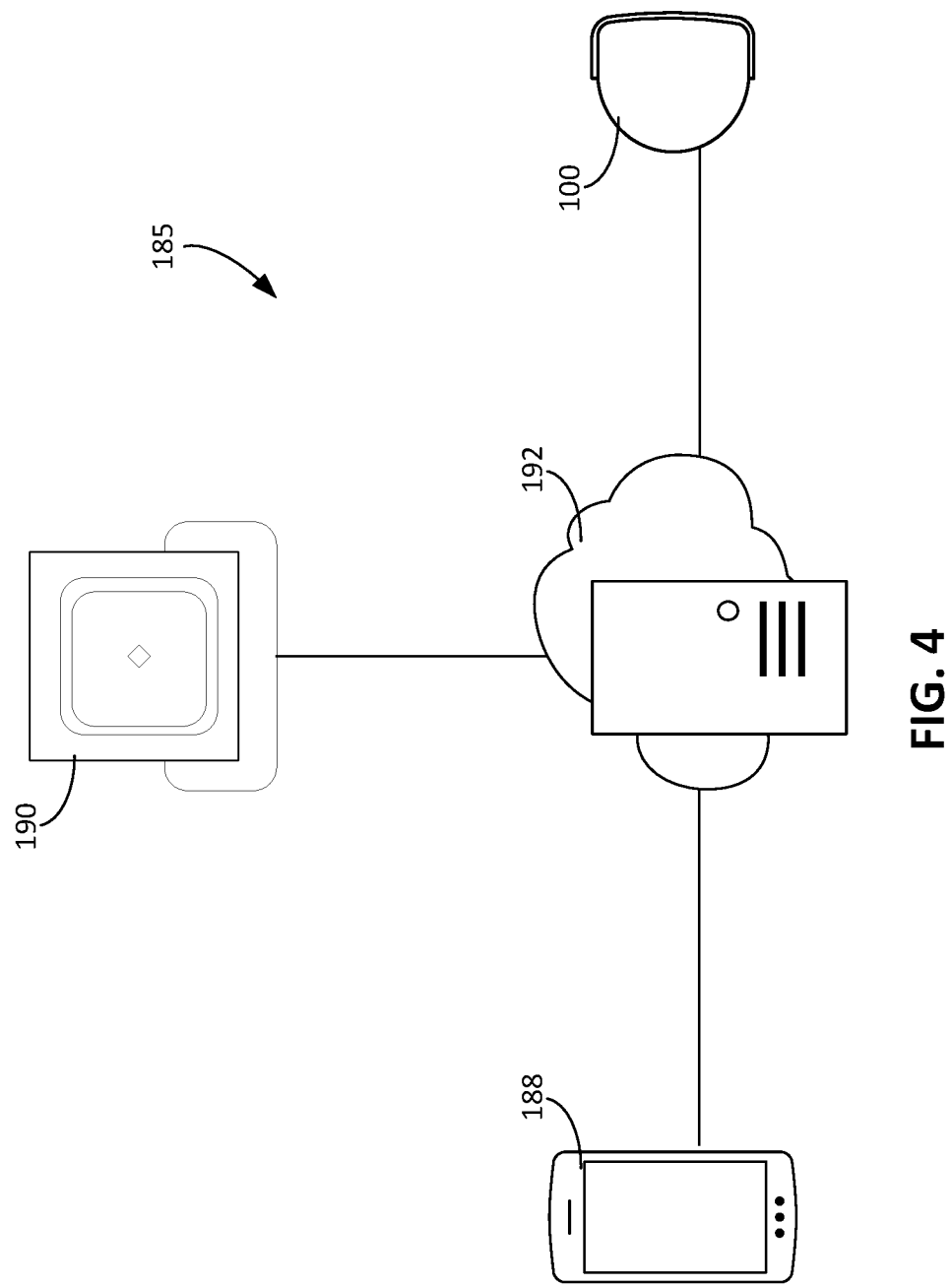

CONTROL OF AUTONOMOUS MOBILE ROBOTS

CROSS-REFERENCE TO RELATED APPLICATIONS

This application is a continuation application of, and claims priority to, U.S. patent application Ser. No. 16/794,855, filed on Feb. 19, 2020, which application claims priority to U.S. Provisional Application Ser. No. 62/932,667, filed on Nov. 8, 2019, the entire contents of each are hereby incorporated by reference.

TECHNICAL FIELD

This specification relates to control of autonomous mobile robots.

BACKGROUND

Autonomous mobile robots include autonomous cleaning robots that autonomously perform cleaning tasks within an environment, e.g., a home. Many kinds of cleaning robots are autonomous to some degree and in different ways. A cleaning robot can include a controller configured to autonomously navigate the robot about an environment such that the robot can ingest debris as it moves.

SUMMARY

An autonomous mobile robot can clean a home during a cleaning mission. During a cleaning mission, the autonomous mobile robot can encounter obstacles that can trigger an escape behavior or can cause the autonomous mobile cleaning robot to become stuck. Such events can be recorded on a map, and based thereon a recommended keep out zone can be provided to a user. The keep out zone can be used to restrict access of the autonomous mobile robot to certain portions of the home. The escape behavior can be triggered by a number of events, such as a brush not being able to turn, the autonomous mobile robot being jammed or wedged underneath an object, the autonomous mobile robot being penned in by obstacles, wheels slipping, or one or more wheels not touching the ground.

In one aspect, a method includes receiving sensor data collected by an autonomous mobile robot as the autonomous mobile robot moves about an environment, the sensor data being indicative of sensor events and locations associated with the sensor events. The method includes identifying a subset of the sensor events based on the locations. The method includes providing, to a user computing device, data indicative of a recommended behavior control zone in the environment, the recommended behavior control zone containing a subset of the locations associated with the subset of the sensor events. The method includes defining, in response to a user selection from the user computing device, a behavior control zone such that the autonomous mobile robot initiates a behavior in response to encountering the behavior control zone, the behavior control zone being based on the recommended behavior control zone.

In another aspect, a method includes presenting, on a user interface of a user computing device, a map of an environment and a first indicator of a recommended behavior control zone overlaid on the map, the recommended behavior control zone being based on sensor data collected by an autonomous mobile robot. The method includes presenting, on the user interface of the user computing device, a second indicator of a user-selected behavior control zone overlaid on the map of the environment based on the recommended behavior control zone.

Implementations can include one or more of the following features.

In some implementations, identifying the subset of the sensor events can include determining a first location in the subset of the locations associated with a first sensor event in the subset of the sensor events is no more than a threshold distance from a second location in the subset of the locations associated with a second sensor event in the subset of the sensor events. In some implementations, identifying the subset of the sensor events can include determining the first location in the subset of the locations associated with the first sensor event in the subset of the sensor events is no more than the threshold distance from a third location in the subset of the locations associated with a third sensor event in the subset of the sensor events. In some implementations, the threshold distance can be no less than 10 to 50 centimeters.

In some implementations, a quantity of sensor events in the subset of the sensor events can be no less than a threshold quantity. In some implementations, the threshold quantity can be no less than three.

In some implementations, the sensor data can include data indicative of the subset of the sensor events, the data indicative of the subset of the sensor events being collected by the autonomous mobile robot during missions performed by the autonomous mobile robot during a time period. In some implementations, identifying the subset of the sensor events can include identifying the subset of the sensor events based on a quantity of the missions during which the autonomous mobile robot collected the data indicative of the subset of the sensor events. In some implementations, the quantity of the missions can be no less than a threshold quantity. In some implementations, the threshold quantity can be no less than two. In some implementations, the time period can be no less than three months.

In some implementations, identifying the subset of the sensor events based on the locations can include identifying the subset of the sensor events based on a distance between a location associated with the subset of the sensor events and a location of a docking station in the environment. In some implementations, the location associated with the subset of the sensor events can correspond to a location in the subset of the locations associated with a sensor event in the subset of the sensor events. In some implementations, the location associated with the subset of the sensor events can correspond to a location computed based on the subset of the locations.

In some implementations, the sensor events can be obstacle detection events in which one or more sensors of the autonomous mobile robot is triggered. In some implementations, the one or more sensors can include at least one of a proximity sensor, a bump sensor, an image capture device, a cliff sensor, a wheel encoder, a wheel motor controller, a brush motor controller, a wheel drop sensor, an odometer, or an optical mouse sensor.

In some implementations, the subset of the sensor events can include error events. The error events can include at least one of: a wheel drop event in which a drive wheel of the autonomous mobile robot extends from the autonomous mobile robot beyond a threshold distance, a wheel slip event in which the drive wheel of the autonomous mobile robot loses traction with a floor surface across with the autonomous mobile robot moves, a wedge event in which the autonomous mobile robot is wedged between an obstacle above the autonomous mobile robot and the floor surface, or a robot stuck event in which the autonomous mobile robot moves into a region in the environment and is unable to exit the region.

In some implementations, the autonomous mobile robot can be an autonomous cleaning robot. The subset of the sensor events can include a brush stall event in which a brush of the autonomous mobile robot is unable to rotate.

In some implementations, the behavior control zone can be a keep out zone, and the behavior initiated by the autonomous mobile robot can correspond to an avoidance behavior in which the autonomous mobile robot avoids the keep out zone. In some implementations, providing the data indicative of the recommended behavior control zone can include providing the data indicative of the recommended behavior control zone such that the recommended behavior control zone separates a first region in the environment from a second region in the environment and provides a traversable path between the first region and the second region.

In some implementations, the autonomous mobile robot can be an autonomous cleaning robot. In some implementations, the behavior control zone can be a focused clean zone, and the behavior initiated by the autonomous mobile robot can correspond to a focused clean behavior. In some implementations, in the focused cleaning behavior, the autonomous mobile robot can increase a suction power or decreases a movement speed. In some implementations, sensor events in the subset of the sensor events can be debris detection events in which the autonomous mobile robot detects debris on a floor surface in the environment. In some implementations, sensor events in the subset of the sensor events can be debris detection events in which the autonomous mobile robot detects debris ingested by the autonomous mobile robot.

In some implementations, the data indicative of the recommended behavior control zone can be indicative of a location, shape, and dimension of the recommended behavior control zone.

In some implementations, providing the data indicative of the recommended behavior control zone can include causing the user computing device to present a map and an indicator of the recommended behavior control zone overlaid on the map.

In some implementations, the user selection can correspond to a user-selected modification of the recommended behavior control zone, and the behavior control zone can be based on the recommended behavior control zone and the user-selected modification of the recommended behavior control zone. In some implementations, the user-selected modification can include a modification of a shape or size of the recommended behavior control zone.

In some implementations, presenting the map and the first indicator can include presenting information indicative of a dimension of the recommended behavior control zone.

In some implementations, the first indicator of the recommended behavior control zone can be indicative of a location of the recommended behavior control zone and a geometry of the recommended behavior control zone.

In some implementations, the second indicator can include a first portion indicative of the recommended behavior control zone and a second portion indicative of a user-selected modification of the recommended behavior control zone. In some implementations, the first portion of the second indicator can include a first shading style, and the second portion of the second indicator can include a second shading style.

In some implementations, the second indicator can be indicative of a location of the user-selected behavior control zone and a geometry of the user-selected behavior control zone.

In some implementations, presenting the second indicator can include presenting information indicative of a dimension of the user-selected behavior control zone.

In some implementations, the sensor data can be indicative of sensor events for the autonomous mobile robot, and the method can further include presenting information indicating a type of the sensor events. In some implementations, the type of the sensor events can be an error event. The error event can include at least one of: a wheel drop event in which a drive wheel of the autonomous mobile robot extends from the autonomous mobile robot beyond a threshold distance, a wheel slip event in which the drive wheel of the autonomous mobile robot loses traction with a floor surface across with the autonomous mobile robot moves, a wedge event in which the autonomous mobile robot is wedged between an obstacle above the autonomous mobile robot and the floor surface, or a robot stuck event in which the autonomous mobile robot moves into a region in the environment and is unable to exit the region.

In some implementations, presenting the second indicator of the user-selected behavior control zone can be based on the recommended behavior control zone and a user-selected modification of the recommended behavior control zone. In some implementations, the user-selected modification of the recommended behavior control zone can include a modification of a shape or a size.

In some implementations, the method can further include transmitting data indicative of the user-selected behavior control zone to define the user-selected behavior control zone and cause the autonomous mobile robot to initiate a behavior in respond to encountering the user-selected behavior control zone as the autonomous mobile robot maneuvers about the environment.

Advantages of the foregoing may include, but are not limited to, those described below and herein elsewhere.

First, the systems and methods described herein represent improvements for autonomous mobile robots and in particular, improve performance of these robots. In performing tasks in an environment, behavior control zones described herein can allow the autonomous mobile robot to perform a task more efficiently. Behavior control zones can ensure that the autonomous mobile robot operates in accordance with optimal parameters within certain regions in the environment. In addition, the behavior control zones can allow the autonomous mobile robot to avoid certain regions where the task cannot be performed. For example, in implementations in which the task is a cleaning task, behavior control zones can be recommended so that the autonomous mobile robot can avoid regions in the environment that cannot be cleaned using a cleaning system of the autonomous mobile robot and can initiate focused clean behaviors in regions that frequently become dirty. Furthermore, the systems and methods described herein can utilize sensor data produced by the sensor system of the autonomous mobile robot to generate the behavior control zones. As a result, rather than only being used to control reactions of the autonomous mobile robot to features in the environment, the sensor system of the autonomous mobile robot can produce data used for a map that can control the behavior of the autonomous mobile robot as the autonomous mobile robot moves about the environment. The map, by using the sensor data from the sensor system of the autonomous mobile robot, can be used for location-based control of the behavior of the autonomous mobile robot.

Second, the systems and methods described herein can improve system-level interactions among autonomous mobile robots, users, and, if present, remote computing systems. In particular, the systems and methods can allow data and input from the autonomous mobile robots, the users, and the remote computing systems to be used together to control the behaviors of one or more of the autonomous mobile robots. Behavior control zones can be generated based on a combination of both sensor data produced by an autonomous mobile robot as well as user input provided by a user. In addition, in implementations in which multiple autonomous mobile robots are present, sensor data from each of the autonomous mobile robots can be used to generate a behavior control zone. Remote computing systems can gather the sensor data from one or more autonomous mobile robots operating in the environment, and can also gather user input from one or more users. A behavior control zone that is generated can be used to control behaviors of multiple autonomous mobile robots operating in the environment. Furthermore, the behavior control zone can allow for tailored control of the autonomous mobile robots. For example, a first of the autonomous mobile robots can be controlled to perform a first behavior when the first autonomous mobile robot encounters the behavior control zone, while a second of the autonomous mobile robots can be controlled to perform a second behavior when the second autonomous mobile robot encounters the behavior control zone.

Finally, the systems and methods described herein can improve user interactions with autonomous mobile robots operating in the environment. The user interface can serve as a medium for the user to receive visual information on location-based control of the autonomous mobile robot. The user interface of the user computing device can present an intuitive map of the environment that shows how the autonomous robot behavior may behave when operating in the environment. The user can thus view the map presented on the user interface to get a sense of the different behavior control zones that are controlling the behavior of the autonomous mobile robot. Furthermore, the user can easily use the user interface to modify or create behavior control zones in the environment.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 4 is a diagram of a communication network.

DETAILED DESCRIPTION

Figure 1:
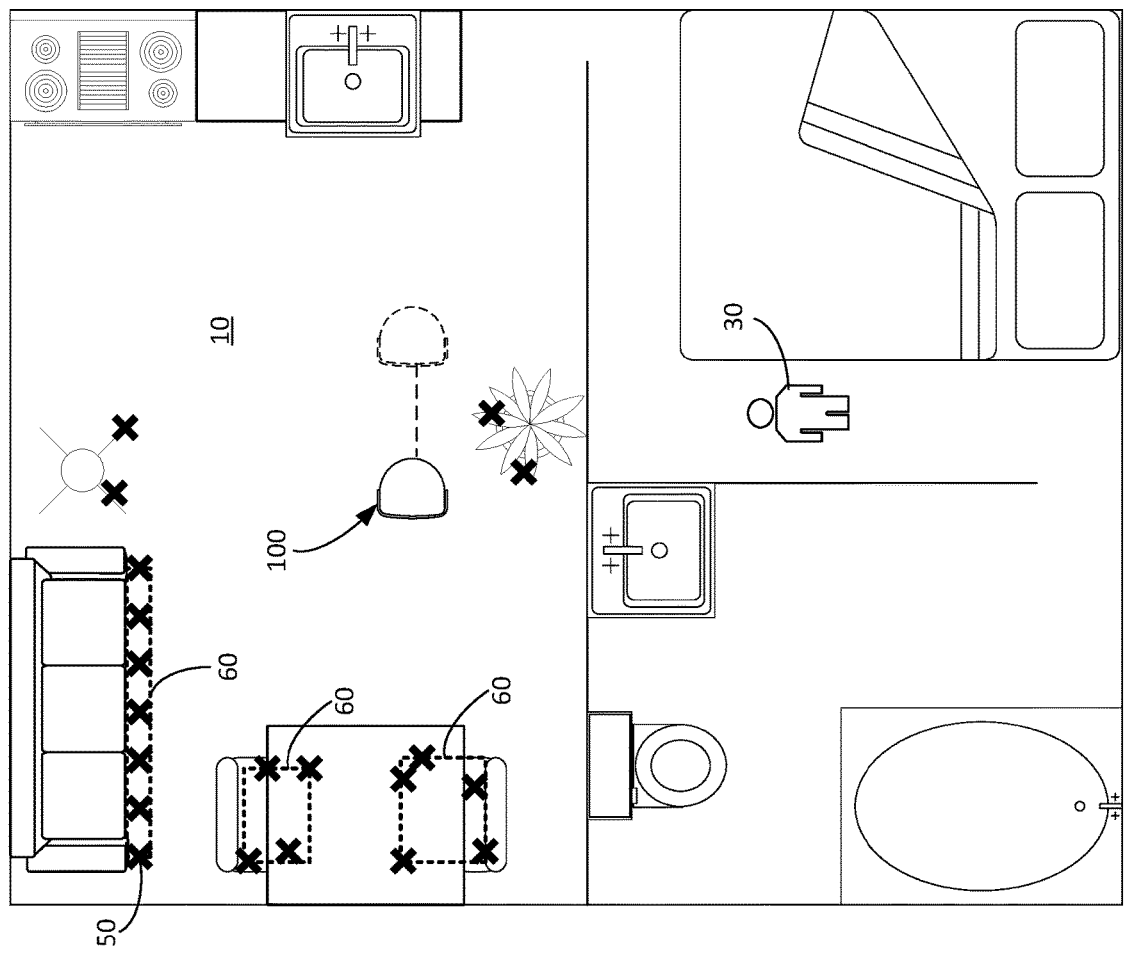
FIG. 1 is a top view of an environment including an autonomous mobile robot and behavior control zones for the autonomous mobile robot.

Referring to FIG. 1, as an autonomous mobile robot 100 navigates about a floor surface 10 in an environment, one or more sensors of a sensor system (not shown in FIG. 1) of the autonomous mobile robot 100 can be triggered, thereby producing one or more sensor events. In the example shown in FIG. 1, several sensor events 50 (represented with "X"-shaped marks, one of which is labeled in FIG. 1) occurred during a portion of the navigation of the robot 100 about the environment. These sensor events 50 can be used to produce a recommended behavior control zone that would control the behavior of the autonomous mobile robot 100 as the robot 100 moves about the floor surface 10. A user 30 can review the recommended behavior control zone and accept or reject the recommended behavior control zone. The user can also modify the recommended behavior control zone. In the example depicted in FIG. 1, several behavior control zones 60 are generated based on the sensor events 50. Locations of the behavior control zones 60 can be based on locations of a subset of the sensor events 50.

One or more of these behavior control zones 60, as described herein, may correspond to user-established behavior control zones, which may in part be based on a recommended behavior control zone. Behavior control zones can allow behaviors of the robot 100 to be controlled as the robot 100 moves about the floor surface 10 after certain sensor events have occurred. The behavior control zones can thus be used to control the behavior of the robot 100 in subsequent missions or at a later time during the same mission in which the sensor events triggering generation of the recommended behavior control zone occurred.

Example Autonomous Mobile Robots

Figure 2:
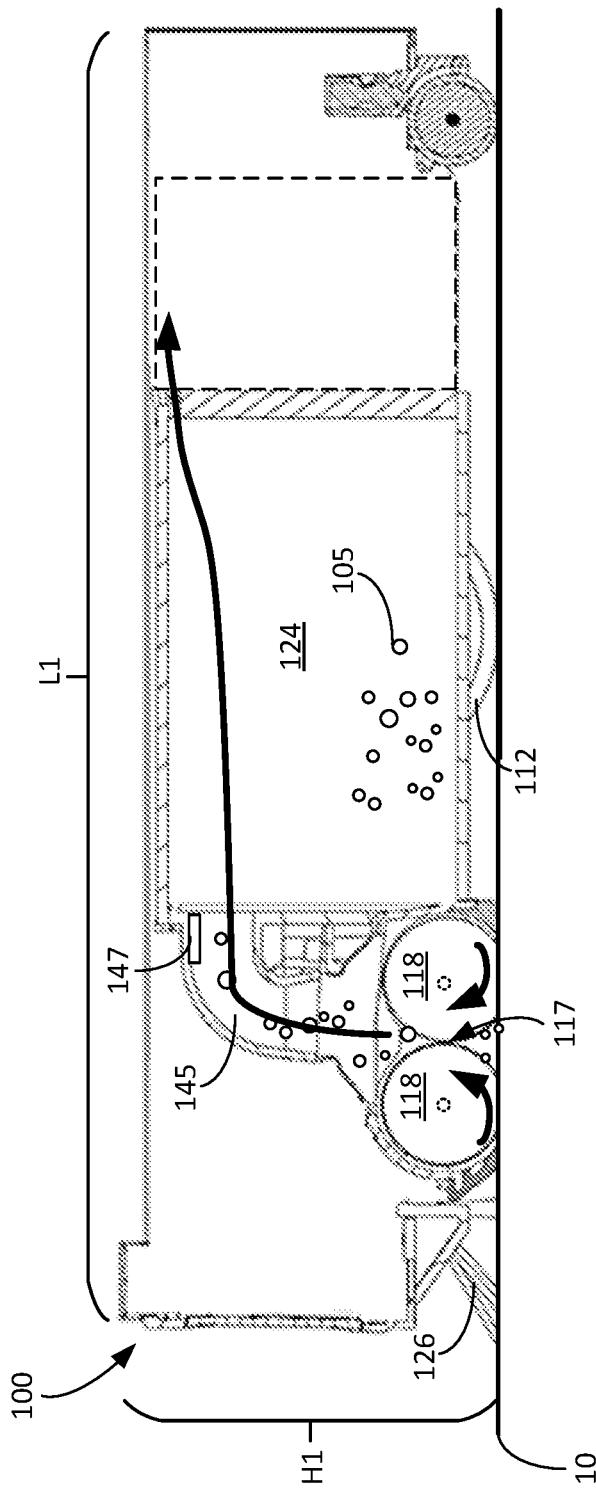
FIGS. 2, 3A, and 3B are side cross-sectional, bottom, and top perspective views of an autonomous mobile robot.
Figure 3A:
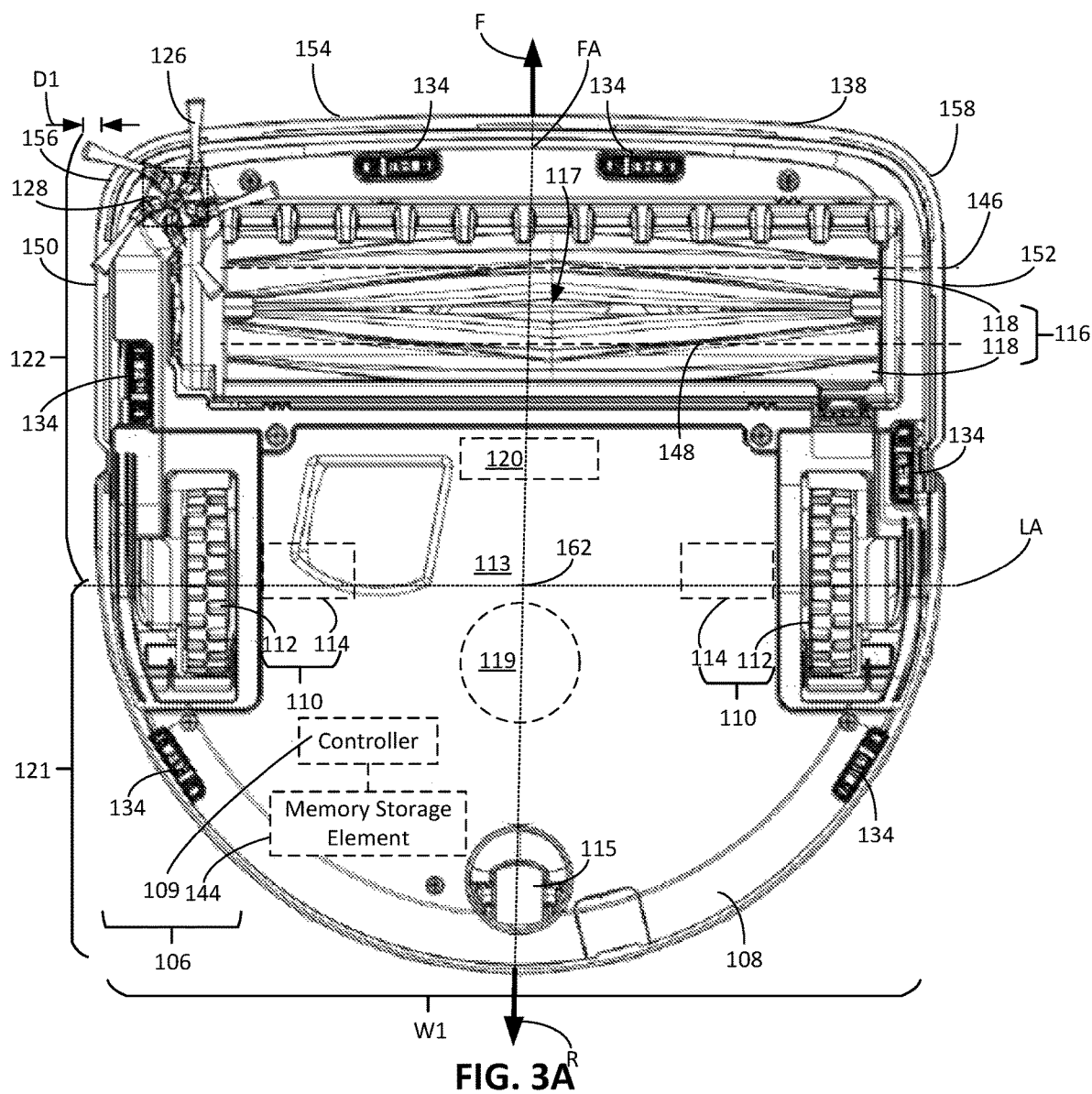

Referring to FIG. 2, the robot 100 collects debris 105 from the floor surface 10 as the robot 100 traverses the floor surface 10. Referring to FIG. 3A, the robot 100 includes a robot housing infrastructure 108. The housing infrastructure 108 can define the structural periphery of the robot 100. In some examples, the housing infrastructure 108 includes a chassis, cover, bottom plate, and bumper assembly. The robot 100 is a household robot that has a small profile so that the robot 100 can fit under furniture within a home. For example, a height H1 (shown in FIG. 2) of the robot 100 relative to the floor surface is, for example, no more than 13 centimeters. The robot 100 is also compact. An overall length L1 (shown in FIG. 2) of the robot 100 and an overall width W1 (shown in FIG. 3A) are each between 30 and 60 centimeters, e.g., between 30 and 40 centimeters, 40 and 50 centimeters, or 50 and 60 centimeters. The overall width W1 can correspond to a width of the housing infrastructure 108 of the robot 100.

The robot 100 includes a drive system 110 including one or more drive wheels. The drive system 110 further includes one or more electric motors including electrically driven portions forming part of the electrical circuitry 106. The housing infrastructure 108 supports the electrical circuitry 106, including at least a controller 109, within the robot 100.

The drive system 110 is operable to propel the robot 100 across the floor surface 10. The robot 100 can be propelled in a forward drive direction F or a rearward drive direction R. The robot 100 can also be propelled such that the robot 100 turns in place or turns while moving in the forward drive direction F or the rearward drive direction R. In the example depicted in FIG. 3A, the robot 100 includes drive wheels 112 extending through a bottom portion 113 of the housing infrastructure 108. The drive wheels 112 are rotated by motors 114 to cause movement of the robot 100 along the floor surface 10. The robot 100 further includes a passive caster wheel 115 extending through the bottom portion 113 of the housing infrastructure 108. The caster wheel 115 is not powered. Together, the drive wheels 112 and the caster wheel 115 cooperate to support the housing infrastructure 108 above the floor surface 10. For example, the caster wheel 115 is disposed along a rearward portion 121 of the housing infrastructure 108, and the drive wheels 112 are disposed forward of the caster wheel 115.

Figure 3B:
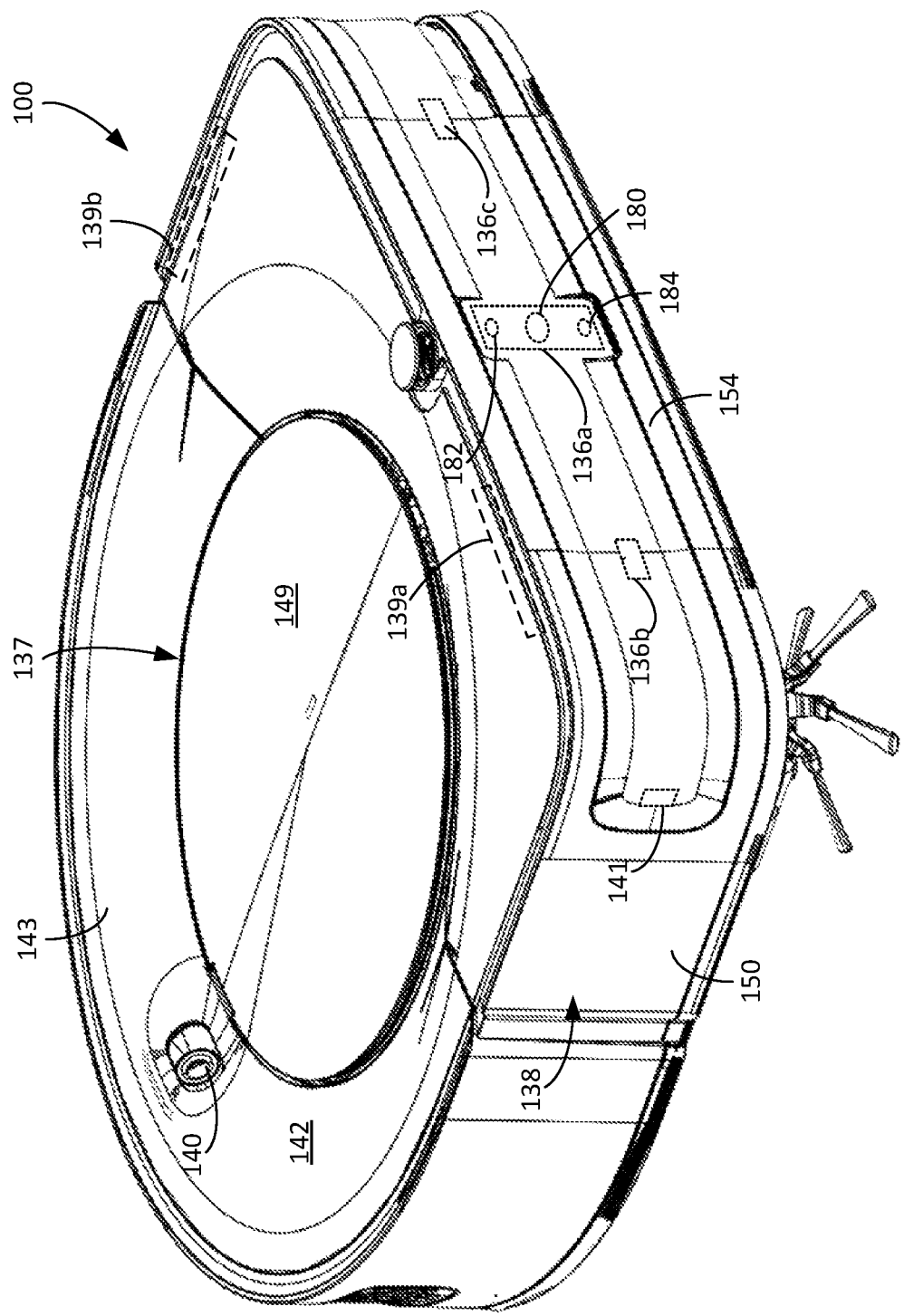

Referring to FIG. 3B, the robot 100 includes a forward portion 122 that is substantially rectangular and a rearward portion 121 that is substantially semicircular. The forward portion 122 includes side surfaces 150, 152, a forward surface 154, and corner surfaces 156, 158. The corner surfaces 156, 158 of the forward portion 122 connect the side surface 150, 152 to the forward surface 154.

In the example depicted in FIGS. 2, 3A, and 3B, the robot 100 is an autonomous mobile floor cleaning robot that includes a cleaning assembly 116 (shown in FIG. 3A) operable to clean the floor surface 10. For example, the robot 100 is a vacuum cleaning robot in which the cleaning assembly 116 is operable to clean the floor surface 10 by ingesting debris 105 (shown in FIG. 2) from the floor surface 10. The cleaning assembly 116 includes a cleaning inlet 117 through which debris is collected by the robot 100. The cleaning inlet 117 is positioned forward of a center of the robot 100, e.g., a center 162, and along the forward portion 122 of the robot 100 between the side surfaces 150, 152 of the forward portion 122.

The cleaning assembly 116 includes one or more rotatable members, e.g., rotatable members 118 driven by a motor 120. The rotatable members 118 extend horizontally across the forward portion 122 of the robot 100. The rotatable members 118 are positioned along a forward portion 122 of the housing infrastructure 108, and extend along 75% to 95% of a width of the forward portion 122 of the housing infrastructure 108, e.g., corresponding to an overall width W1 of the robot 100. Referring also to FIG. 2, the cleaning inlet 117 is positioned between the rotatable members 118.

As shown in FIG. 2, the rotatable members 118 are rollers that counter rotate relative to one another. For example, the rotatable members 118 can be rotatable about parallel horizontal axes 146, 148 (shown in FIG. 3A) to agitate debris 105 on the floor surface 10 and direct the debris 105 toward the cleaning inlet 117, into the cleaning inlet 117, and into a suction pathway 145 (shown in FIG. 2) in the robot 100. Referring back to FIG. 3A, the rotatable members 118 can be positioned entirely within the forward portion 122 of the robot 100. The rotatable members 118 include elastomeric shells that contact debris 105 on the floor surface 10 to direct debris 105 through the cleaning inlet 117 between the rotatable members 118 and into an interior of the robot 100, e.g., into a debris bin 124 (shown in FIG. 2), as the rotatable members 118 rotate relative to the housing infrastructure 108. The rotatable members 118 further contact the floor surface 10 to agitate debris 105 on the floor surface 10.

The robot 100 further includes a vacuum system 119 operable to generate an airflow through the cleaning inlet 117 between the rotatable members 118 and into the debris bin 124. The vacuum system 119 includes an impeller and a motor to rotate the impeller to generate the airflow. The vacuum system 119 cooperates with the cleaning assembly 116 to draw debris 105 from the floor surface 10 into the debris bin 124. In some cases, the airflow generated by the vacuum system 119 creates sufficient force to draw debris 105 on the floor surface 10 upward through the gap between the rotatable members 118 into the debris bin 124. In some cases, the rotatable members 118 contact the floor surface 10 to agitate the debris 105 on the floor surface 10, thereby allowing the debris 105 to be more easily ingested by the airflow generated by the vacuum system 119.

The robot 100 further includes a brush 126 that rotates about a non-horizontal axis, e.g., an axis forming an angle between 75 degrees and 90 degrees with the floor surface 10. The non-horizontal axis, for example, forms an angle between 75 degrees and 90 degrees with the longitudinal axes of the rotatable members 118. The robot 100 includes a motor 128 operably connected to the brush 126 to rotate the brush 126.

The brush 126 is a side brush laterally offset from a fore-aft axis FA of the robot 100 such that the brush 126 extends beyond an outer perimeter of the housing infrastructure 108 of the robot 100. For example, the brush 126 can extend beyond one of the side surfaces 150, 152 of the robot 100 and can thereby be capable of engaging debris on portions of the floor surface 10 that the rotatable members 118 typically cannot reach, e.g., portions of the floor surface 10 outside of a portion of the floor surface 10 directly underneath the robot 100. The brush 126 is also forwardly offset from a lateral axis LA of the robot 100 such that the brush 126 also extends beyond the forward surface 154 of the housing infrastructure 108. As depicted in FIG. 3A, the brush 126 extends beyond the side surface 150, the corner surface 156, and the forward surface 154 of the housing infrastructure 108. In some implementations, a horizontal distance D1 that the brush 126 extends beyond the side surface 150 is at least, for example, 0.2 centimeters, e.g., at least 0.25 centimeters, at least 0.3 centimeters, at least 0.4 centimeters, at least 0.5 centimeters, at least 1 centimeter, or more. The brush 126 is positioned to contact the floor surface 10 during its rotation so that the brush 126 can easily engage the debris 105 on the floor surface 10.

The brush 126 is rotatable about the non-horizontal axis in a manner that brushes debris on the floor surface 10 into a cleaning path of the cleaning assembly 116 as the robot 100 moves. For example, in examples in which the robot 100 is moving in the forward drive direction F, the brush 126 is rotatable in a clockwise direction (when viewed from a perspective above the robot 100) such that debris that the brush 126 contacts moves toward the cleaning assembly and toward a portion of the floor surface 10 in front of the cleaning assembly 116 in the forward drive direction F. As a result, as the robot 100 moves in the forward drive direction F, the cleaning inlet 117 of the robot 100 can collect the debris swept by the brush 126. In examples in which the robot 100 is moving in the rearward drive direction R, the brush 126 is rotatable in a counterclockwise direction (when viewed from a perspective above the robot 100) such that debris that the brush 126 contacts moves toward a portion of the floor surface 10 behind the cleaning assembly 116 in the rearward drive direction R. As a result, as the robot 100 moves in the rearward drive direction R, the cleaning inlet 117 of the robot 100 can collect the debris swept by the brush 126.

The electrical circuitry 106 includes, in addition to the controller 109, a memory storage element 144 and a sensor system with one or more electrical sensors, for example. The sensor system, as described herein, can generate a signal indicative of a current location of the robot 100, and can generate signals indicative of locations of the robot 100 as the robot 100 travels along the floor surface 10. The controller 109 is configured to execute instructions to perform one or more operations as described herein. The memory storage element 144 is accessible by the controller 109 and disposed within the housing infrastructure 108. The one or more electrical sensors are configured to detect features in an environment of the robot 100. For example, referring to FIG. 3A, the sensor system includes cliff sensors 134 disposed along the bottom portion 113 of the housing infrastructure 108. Each of the cliff sensors 134 is an optical sensor that can detect the presence or the absence of an object below the optical sensor, such as the floor surface 10. The cliff sensors 134 can thus detect obstacles such as drop-offs and cliffs below portions of the robot 100 where the cliff sensors 134 are disposed and redirect the robot accordingly.

Referring to FIG. 3B, the sensor system includes one or more proximity sensors that can detect objects along the floor surface 10 that are near the robot 100. For example, the sensor system can include proximity sensors 136a, 136b, 136c disposed proximate the forward surface 154 of the housing infrastructure 108. Each of the proximity sensors 136a, 136b, 136c includes an optical sensor facing outward from the forward surface 154 of the housing infrastructure 108 and that can detect the presence or the absence of an object in front of the optical sensor. For example, the detectable objects include obstacles such as furniture, walls, persons, and other objects in the environment of the robot 100.

The sensor system includes a bumper system including the bumper 138 and one or more bump sensors that detect contact between the bumper 138 and obstacles in the environment. The bumper 138 forms part of the housing infrastructure 108. For example, the bumper 138 can form the side surfaces 150, 152 as well as the forward surface 154. The sensor system, for example, can include the bump sensors 139a, 139b. The bump sensors 139a, 139b can include break beam sensors, capacitive sensors, or other sensors that can detect contact between the robot 100, e.g., the bumper 138, and objects in the environment. In some implementations, the bump sensor 139a can be used to detect movement of the bumper 138 along the fore-aft axis FA (shown in FIG. 3A) of the robot 100, and the bump sensor 139b can be used to detect movement of the bumper 138 along the lateral axis LA (shown in FIG. 3A) of the robot 100. The proximity sensors 136a, 136b, 136c can detect objects before the robot 100 contacts the objects, and the bump sensors 139a, 139b can detect objects that contact the bumper 138, e.g., in response to the robot 100 contacting the objects.

The sensor system includes one or more obstacle following sensors. For example, the robot 100 can include an obstacle following sensor 141 along the side surface 150. The obstacle following sensor 141 includes an optical sensor facing outward from the side surface 150 of the housing infrastructure 108 and that can detect the presence or the absence of an object adjacent to the side surface 150 of the housing infrastructure 108. The obstacle following sensor 141 can emit an optical beam horizontally in a direction perpendicular to the forward drive direction F of the robot 100 and perpendicular to the side surface 150 of the robot 100. For example, the detectable objects include obstacles such as furniture, walls, persons, and other objects in the environment of the robot 100. In some implementations, the sensor system can include an obstacle following sensor along the side surface 152, and the obstacle following sensor can detect the presence or the absence an object adjacent to the side surface 152. The obstacle following sensor 141 along the side surface 150 is a right obstacle following sensor, and the obstacle following sensor along the side surface 152 is a left obstacle following sensor. The one or more obstacle following sensors, including the obstacle following sensor 141, can also serve as obstacle detection sensors, e.g., similar to the proximity sensors described herein. In this regard, the left obstacle following can be used to determine a distance between an object, e.g., an obstacle surface, to the left of the robot 100 and the robot 100, and the right obstacle following sensor can be used to determine a distance between an object, e.g., an obstacle surface, to the right of the robot 100 and the robot 100.

In some implementations, at least some of the proximity sensors 136a, 136b, 136c, and the obstacle following sensor 141 each includes an optical emitter and an optical detector. The optical emitter emits an optical beam outward from the robot 100, e.g., outward in a horizontal direction, and the optical detector detects a reflection of the optical beam that reflects off an object near the robot 100. The robot 100, e.g., using the controller 109, can determine a time of flight of the optical beam and thereby determine a distance between the optical detector and the object, and hence a distance between the robot 100 and the object.

In some implementations, the proximity sensor 136a includes an optical detector 180 and multiple optical emitters 182, 184. One of the optical emitters 182, 184 can be positioned to direct an optical beam outwardly and downwardly, and the other of the optical emitters 182, 184 can be positioned to direct an optical beam outwardly and upwardly. The optical detector 180 can detect reflections of the optical beams or scatter from the optical beams. In some implementations, the optical detector 180 is an imaging sensor, a camera, or some other type of detection device for sensing optical signals. In some implementations, the optical beams illuminate horizontal lines along a planar vertical surface forward of the robot 100. In some implementations, the optical emitters 182, 184 each emit a fan of beams outward toward an obstacle surface such that a one-dimensional grid of dots appears on one or more obstacle surfaces. The one-dimensional grid of dots can be positioned on a horizontally extending line. In some implementations, the grid of dots can extend across multiple obstacle surfaces, e.g., multiple obstacles surfaces adjacent to one another. The optical detector 180 can capture an image representative of the grid of dots formed by the optical emitter 182 and the grid of dots formed by the optical emitter 184. Based on a size of a dot in the image, the robot 100 can determine a distance of an object on which the dot appears relative to the optical detector 180, e.g., relative to the robot 100. The robot 100 can make this determination for each of the dots, thus allowing the robot 100 to determine a shape of an object on which the dots appear. In addition, if multiple objects are ahead of the robot 100, the robot 100 can determine a shape of each of the objects. In some implementations, the objects can include one or more objects that are laterally offset from a portion of the floor surface 10 directly in front of the robot 100.

The sensor system further includes an image capture device 140, e.g., a camera, directed toward a top portion 142 of the housing infrastructure 108. The image capture device 140 generates digital imagery of the environment of the robot 100 as the robot 100 moves about the floor surface 10. The image capture device 140 is angled in an upward direction, e.g., angled between 30 degrees and 80 degrees from the floor surface 10 about which the robot 100 navigates. The camera, when angled upward, is able to capture images of wall surfaces of the environment so that features corresponding to objects on the wall surfaces can be used for localization.

When the controller 109 causes the robot 100 to perform the mission, the controller 109 operates the motors 114 to drive the drive wheels 112 and propel the robot 100 along the floor surface 10. In addition, the controller 109 operates the motor 120 to cause the rotatable members 118 to rotate, operates the motor 128 to cause the brush 126 to rotate, and operates the motor of the vacuum system 119 to generate the airflow. To cause the robot 100 to perform various navigational and cleaning behaviors, the controller 109 executes software stored on the memory storage element 144 to cause the robot 100 to perform by operating the various motors of the robot 100. The controller 109 operates the various motors of the robot 100 to cause the robot 100 to perform the behaviors.

The sensor system can further include sensors for tracking a distance traveled by the robot 100. For example, the sensor system can include encoders associated with the motors 114 for the drive wheels 112, and these encoders can track a distance that the robot 100 has traveled. In some implementations, the sensor system includes an optical sensor facing downward toward a floor surface. The optical sensor can be an optical mouse sensor. For example, the optical sensor can be positioned to direct light through a bottom surface of the robot 100 toward the floor surface 10. The optical sensor can detect reflections of the light and can detect a distance traveled by the robot 100 based on changes in floor features as the robot 100 travels along the floor surface 10.

The sensor system can further include a debris detection sensor 147 for detecting debris on the floor surface 10. The debris detection sensor 147 can be used to detect portions of the floor surface 10 in the environment that are dirtier than other portions of the floor surface 10 in the environment. In some implementations, the debris detection sensor 147 (shown in FIG. 2) is capable of detecting an amount of debris, or a rate of debris, passing through the suction pathway 145. The debris detection sensor 147 can be an optical sensor configured to detect debris as it passes through the suction pathway 145. Alternatively, the debris detection sensor 147 can be a piezoelectric sensor that detects debris as the debris impacts a wall of the suction pathway 145. In some implementations, the debris detection sensor 147 detects debris before the debris is ingested by the robot 100 into the suction pathway 145. The debris detection sensor 147 can be, for example, an image capture device that captures images of a portion of the floor surface 10 ahead of the robot 100. The image capture device can be positioned on a forward portion of the robot 100 can be directed in such a manner to detect debris on the portion of the floor surface 10 ahead of the robot 100. The controller 109 can then use these images to detect the presence of debris on this portion of the floor surface 10.

The controller 109 uses data collected by the sensors of the sensor system to control navigational behaviors of the robot 100 during the mission. For example, the controller 109 uses the sensor data collected by obstacle detection sensors of the robot 100, e.g., the cliff sensors 134, the proximity sensors 136a, 136b, 136c, and the bump sensors 139a, 139b, to enable the robot 100 to avoid obstacles within the environment of the robot 100 during the mission.

The sensor data can be used by the controller 109 for simultaneous localization and mapping (SLAM) techniques in which the controller 109 extracts features of the environment represented by the sensor data and constructs a map of the floor surface 10 of the environment. The sensor data collected by the image capture device 140 can be used for techniques such as vision-based SLAM (VSLAM) in which the controller 109 extracts visual features corresponding to objects in the environment and constructs the map using these visual features. As the controller 109 directs the robot 100 about the floor surface 10 during the mission, the controller 109 uses SLAM techniques to determine a location of the robot 100 within the map by detecting features represented in collected sensor data and comparing the features to previously stored features. The map formed from the sensor data can indicate locations of traversable and nontraversable space within the environment. For example, locations of obstacles are indicated on the map as nontraversable space, and locations of open floor space are indicated on the map as traversable space.

The sensor data collected by any of the sensors can be stored in the memory storage element 144. In addition, other data generated for the SLAM techniques, including mapping data forming the map, can be stored in the memory storage element 144. These data produced during the mission can include persistent data that are produced during the mission and that are usable during a further mission. For example, the mission can be a first mission, and the further mission can be a second mission occurring after the first mission. In addition to storing the software for causing the robot 100 to perform its behaviors, the memory storage element 144 stores sensor data or data resulting from processing of the sensor data for access by the controller 109 from one mission to another mission. For example, the map is a persistent map that is usable and updateable by the controller 109 of the robot 100 from one mission to another mission to navigate the robot 100 about the floor surface 10.

The persistent data, including the persistent map, enable the robot 100 to efficiently clean the floor surface 10. For example, the persistent map enables the controller 109 to direct the robot 100 toward open floor space and to avoid nontraversable space. In addition, for subsequent missions, the controller 109 is able to plan navigation of the robot 100 through the environment using the persistent map to optimize paths taken during the missions.

The robot 100 can, in some implementations, include a light indicator system 137 located on the top portion 142 of the robot 100. The light indicator system 137 can include light sources positioned within a lid 149 covering the debris bin 124 (shown in FIG. 3A). The light sources can be positioned to direct light to a periphery of the lid 149. The light sources are positioned such that any portion of a continuous loop 143 on the top portion 142 of the robot 100 can be illuminated. The continuous loop 143 is located on a recessed portion of the top portion 142 of the robot 100 such that the light sources can illuminate a surface of the robot 100 as they are activated.

Example Communication Networks

Referring to FIG. 4, an example communication network 185 is shown. Nodes of the communication network 185 include the robot 100, a user computing device 188, an autonomous mobile robot 190, and a remote computing system 192. Using the communication network 185, the robot 100, the user computing device 188, the robot 190, and the remote computing system 192 can communicate with one another to transmit data to one another and receive data from one another. In some implementations, the robot 100, the robot 190, or both the robot 100 and the robot 190 communicate with the user computing device 188 through the remote computing system 192. Alternatively or additionally, the robot 100, the robot 190, or both the robot 100 and the robot 190 communicate directly with the user computing device 188. Various types and combinations of wireless networks (e.g., Bluetooth, radio frequency, optical-based, etc.) and network architectures (e.g., mesh networks) may be employed by the communication network 185.

In some implementations, the user computing device 188 as shown in FIG. 4 is a remote device that can be linked to the remote computing system 192 and can enable the user 30 to provide inputs on the user computing device 188. The user computing device 188 can include user input elements such as, for example, one or more of a touchscreen display, buttons, a microphone, a mouse, a keyboard, or other devices that respond to inputs provided by the user 30. The user computing device 188 alternatively or additionally includes immersive media (e.g., virtual reality) with which the user 30 interacts to provide a user input. The user computing device 188, in these cases, is, for example, a virtual reality headset or a head-mounted display. The user can provide inputs corresponding to commands for the mobile robot 100. In such cases, the user computing device 188 transmits a signal to the remote computing system 192 to cause the remote computing system 192 to transmit a command signal to the mobile robot 100. In some implementations, the user computing device 188 can present augmented reality images. In some implementations, the user computing device 188 is a smartphone, a laptop computer, a tablet computing device, or other mobile device.

In some implementations, the communication network 185 can include additional nodes. For example, nodes of the communication network 185 can include additional robots. Alternatively or additionally, nodes of the communication network 185 can include network-connected devices. In some implementations, a network-connected device can generate information about the environment 20. The network-connected device can include one or more sensors to detect features in the environment 20, such as an acoustic sensor, an image capture system, or other sensor generating signals from which features can be extracted. Network-connected devices can include home cameras, smart sensors, and the like.

In the communication network 185 depicted in FIG. 4 and in other implementations of the communication network 185, the wireless links may utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel or satellite band. In some cases, the wireless links include any cellular network standards used to communicate among mobile devices, including, but not limited to, standards that qualify as 1G, 2G, 3G, or 4G. The network standards, if utilized, qualify as, for example, one or more generations of mobile telecommunication standards by fulfilling a specification or standards such as the specifications maintained by International Telecommunication Union. The 3G standards, if utilized, correspond to, for example, the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA.

Example Processes

The robot 100 can be controlled in certain manners in accordance with processes described herein to define and establish behavior control zones. While some operations of these processes may be described as being performed by the robot 100, by a user, by a computing device, or by another actor, these operations may, in some implementations, be performed by actors other than those described. For example, an operation performed by the robot 100 can be, in some implementations, performed by the remote computing system 192 or by another computing device (or devices). In other examples, an operation performed by the user 30 can be performed by a computing device. In some implementations, the remote computing system 192 does not perform any operations. Rather, other computing devices perform the operations described as being performed by the remote computing system 192, and these computing devices can be in direct (or indirect) communication with one another and the robot 100. And in some implementations, the robot 100 can perform, in addition to the operations described as being performed by the robot 100, the operations described as being performed by the remote computing system 192 or the user computing device 188. Other variations are possible. Furthermore, while the methods, processes, and operations described herein are described as including certain operations or sub-operations, in other implementations, one or more of these operations or sub-operations may be omitted, or additional operations or sub-operations may be added.

The behavior controlled by the behavior control zone can vary in implementations. In some implementations, the behavior controlled by the behavior control zone can be a movement of the robot 100. For example, the behavior control zone, when entered by or encountered by the robot 100, can cause the robot 100 to perform a movement behavior, such as an escape behavior, an avoidance behavior, or a follow behavior. For example, in the movement behavior, the robot can move in a certain movement pattern within the behavior control zone, to move at a certain movement speed within the behavior control zone, to move away from the behavior control zone, or to move along a perimeter of the behavior control zone.

If the movement behavior is an escape behavior, entering or encountering the behavior control zone can indicate that the robot 100 is near obstacles that could cause the robot 100 to become stuck. The robot 100 can initiate movement in a manner to avoid becoming stuck by certain obstacles in the vicinity of the behavior control zone.

If the movement behavior is an avoidance behavior, the behavior control zone is a keep out zone. The robot 100 can move in a manner to avoid entering into an interior of the behavior control zone. Such movement can include reversing relative to the behavior control zone and then moving away from the behavior control zone. If the movement behavior is a follow behavior, the robot 100 can follow along the perimeter of the behavior control zone without entering into the interior of the behavior control zone.

In some implementations, the behavior controlled by the behavior control zone can be a parameter of a cleaning process of the robot 100. The behavior control zone can be, for example, a focused clean zone. The parameter can be a suction power of the vacuum system 119 of the robot 100, a movement speed of the robot 100, a rotation speed of the brush 126, a rotation speed of the rotatable members 118, or a movement pattern of the robot 100. The suction power can be increased in the focused clean behavior, the movement speed of the robot 100 can be decreased, and/or the movement pattern of the robot 100 can be adjusted to pass over a region covered by the behavior control zone multiple times. The behavior can correspond to a focused clean behavior in which the robot 100 performed a focused clean of a region covered by the behavior control zone. To perform the focused clean, the behavior control zone causes the robot 100 to adjust the parameter of the cleaning process of the robot 100.

Figure 5:
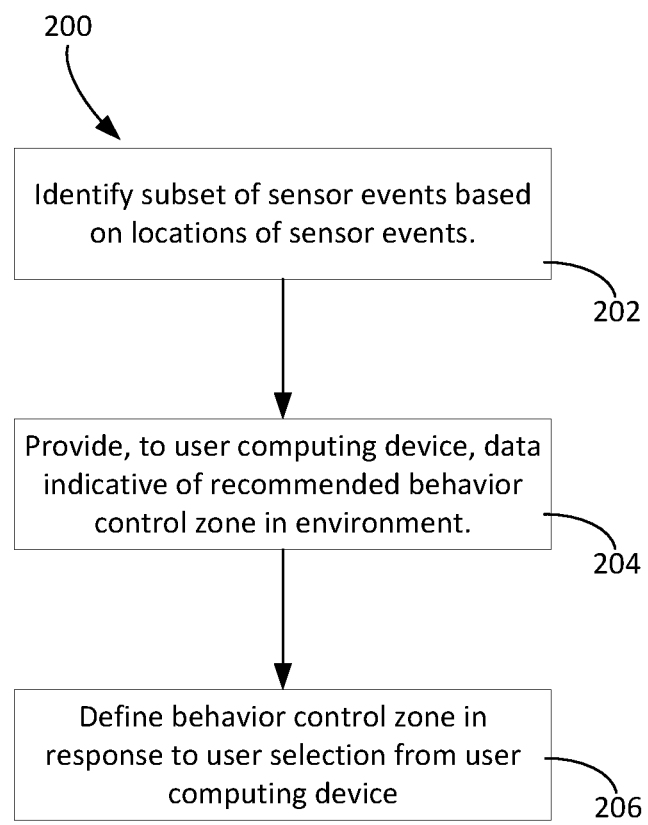
FIG. 5 is a flowchart of a process of defining a behavior control zone.

FIG. 5 illustrates a flowchart of an example method for defining a behavior control zone. Sensor data collected by an autonomous mobile robot, e.g., the robot 100 shown in FIG. 1, can be used to provide a recommended behavior control zone, and a user can accept or modify the recommended behavior control zone to define a behavior control zone for controlling the behavior of the robot 100. This method is described with respect to control of the robot 100 described herein. In other implementations, other types of autonomous mobile robots may be controlled by defining a behavior control zone in accordance with implementations of the method shown in FIG. 5.

Referring to FIG. 5, a process 200 includes operations 202, 204, and 206. The process 200 is used to define a behavior control zone for controlling a behavior of the robot 100, or other autonomous mobile robots operating in the environment. In particular, when the robot 100 encounters the behavior control zone, the robot 100 can initiate a certain behavior in response to the encounter. The robot 100 can encounter the behavior control zone upon being within a certain distance of the behavior control zone or upon entering the behavior control zone.

At the operation 202, a subset of sensor events is identified based on locations of the sensor events. Before the subset of sensor events are identified, the robot 100 can collect sensor data as the robot 100 moves about the environment. These sensor data can be indicative of the sensor events and locations associated with the sensor events.

A sensor event can occur when one or more sensors of the sensor system of the robot 100 are triggered. A feature in the environment can be associated with the sensor event. A location of a sensor event can correspond to a location of the robot 100 when the sensor event occurs, or can correspond to a location of the feature detected by the sensor of the robot 100 for which the sensor event has occurred.

For example, referring briefly to FIG. 1, the sensor events 50 can occur as the robot 100 moves about the floor surface 10, and locations of the sensor events 50 can be determined once the sensor events 50 occur. At the operation 202, a subset of the sensor events 50 is identified as a candidate for recommending a behavior control zone to the user.

The feature detected by the sensor of the robot 100 can vary in implementations. In some implementations, the feature detected by the sensor of the robot 100 can correspond to an object in the environment. The object can be an obstacle. In such examples, the sensor events are obstacle detection events in which one or more sensors of the robot 100 is triggered. The obstacle can define nontraversable space on the floor surface 10, i.e., a portion of the floor surface 10 that the robot 100 cannot move across due to the presence of the object. The obstacle could be, for example, a fixture, a wall, a cliff, a cord, or other objects in the environment that could impede movement of the robot 100. In some implementations, the feature detected by the sensor of the robot 100 can correspond to a geometry of traversable space defined by one or more objects in the environment. For example, walls and other objects in the environment could define a narrow passageway of traversable space, e.g., having a width of 1 to 3 widths of the robot 100. A sensor event could occur based on detecting the presence of the passageway of traversable space, the robot 100. In some implementations, the obstacle can be a feature on the floor surface 10 that could impede operations of the robot 100. For example, the obstacle could become entrained in a wheel, brush, or rotatable member of the robot 100. The obstacle could be a cord, an article of clothing, or other object that can wrap around a rotating member of the robot 100.

In some implementations, the feature detected by the sensor of the robot 100 can correspond to debris on the floor surface 10. For example, the feature can correspond to debris detected on the floor surface 10 or debris ingested by the robot 100. The subset of the sensor events can be debris detection events in which the robot 100 detects debris on the floor surface 10 or detects debris ingested by the robot 100.

In some implementations, the feature can correspond to an object in the environment associated with debris. For example, the object could be a dining room table. The sensor event can correspond to one or more sensors of the robot 100 detecting the dining room table. Because debris may be more frequently dropped around the dining room table as compared to certain other objects, detection of the dining room table may trigger a sensor event for the purpose of defining a behavior control zone. The behavior control zone can be recommended even if the robot 100 does not detect debris in a vicinity around the dining room table. Other objects may also be associated with frequent debris drops. For example, the object can be a doormat, a door, a kitchen island, a dining room table, a trash can, a window, a pet home, a cabinet, or another feature object in the environment associated with increased debris.

Other features can be detected by the robot 100 and can trigger sensor events. For example, the feature detected by the sensor of the robot 100 to trigger a sensor event can be a floor surface type or a room type.

In some implementations, the sensor events are error events in which errors associated with the robot 100 are triggered as the robot 100 moves about the floor surface 10. In response to such error events, the robot 100 may cease movement during a mission. In some implementations, the error events include a wheel drop event in which one or more of the drive wheels 112 of the robot 100 extends from the robot beyond a threshold distance. The wheel drop event can be detected by a wheel drop sensor of the robot 100. In some implementations, the error events include a wheel slip event in which one or more of the drive wheels 112 of the robot 100 loses traction with the floor surface 10 across which the robot 100 moves. The wheel slip event can be detected by one or more of the sensors of the robot 100, such as the encoders, the odometer, or other movement sensors of the robot 100. In some implementations, the error events include a wedge event in which the robot 100 is wedged between an obstacle in the environment above the robot 100 and the floor surface 10. The wedge event can be detected by a bump sensor of the robot 100 or the image capture device 140 of the robot 100. In some implementations, the error events include a robot stuck event in which the robot 100 moves into a region in the environment and is unable to exit the region. For example, a traversable portion of the region may have constrained dimensions that make it difficult for the robot 100 to exit the region. In some implementations, the error events include a brush stall event in which the brush 126, or the rotatable members 118 are unable to rotate. The brush stall event can be detected by an encoder associated with a motor that drives the brush 126 or a motor that drives the rotatable members 118.

For example, if the robot 100 includes a bump sensor, a sensor event can occur when the bump sensor is triggered. A location of the sensor event can correspond to a location of the robot 100 when the bump sensor is triggered, or can correspond to a location of contact between the robot 100 and an object in the environment that triggers the bump sensor. In further examples, if the robot 100 includes the image capture device 140, a sensor event can occur when the image capture device 140 captures imagery containing a particular object in the environment. The object can be an obstacle in the environment that the robot 100 can contact during navigation. A location of the sensor event can correspond to a location of the robot 100 when the image capture device 140 detects the object. Alternatively, the location of the sensor event can correspond to an estimated location of the detected object. The imagery captured by the image capture device 140 can be analyzed to determine a position of the object relative to the robot 100 such that the location of the object within the environment can be estimated. Sensor events can occur when other sensors of the robot 100 are triggered as well. For example, the sensor events can occur based on sensing performed by the proximity sensors 136a, 136b, 136c, the cliff sensors 134, the obstacle following sensor 141, the optical mouse sensor, the encoders, a brush motor controller, a wheel motor controller, a wheel drop sensor, an odometer, or other sensors of the sensor system.

In some implementations, multiple sensors can be involved in a sensor event. For example, one of the proximity sensors 136a, 136b, 136c can detect an obstacle in the environment, and the image capture device 140 can also detect the same obstacle. A combination of data from the proximity sensor and the image capture device 140 can indicate a sensor event has occurred. A location of the sensor event can be determined based on the combination of data from the proximity sensor and the image capture device 140. Other combinations of sensors described herein could be used as the basis for a sensor event.

Figure 6A:
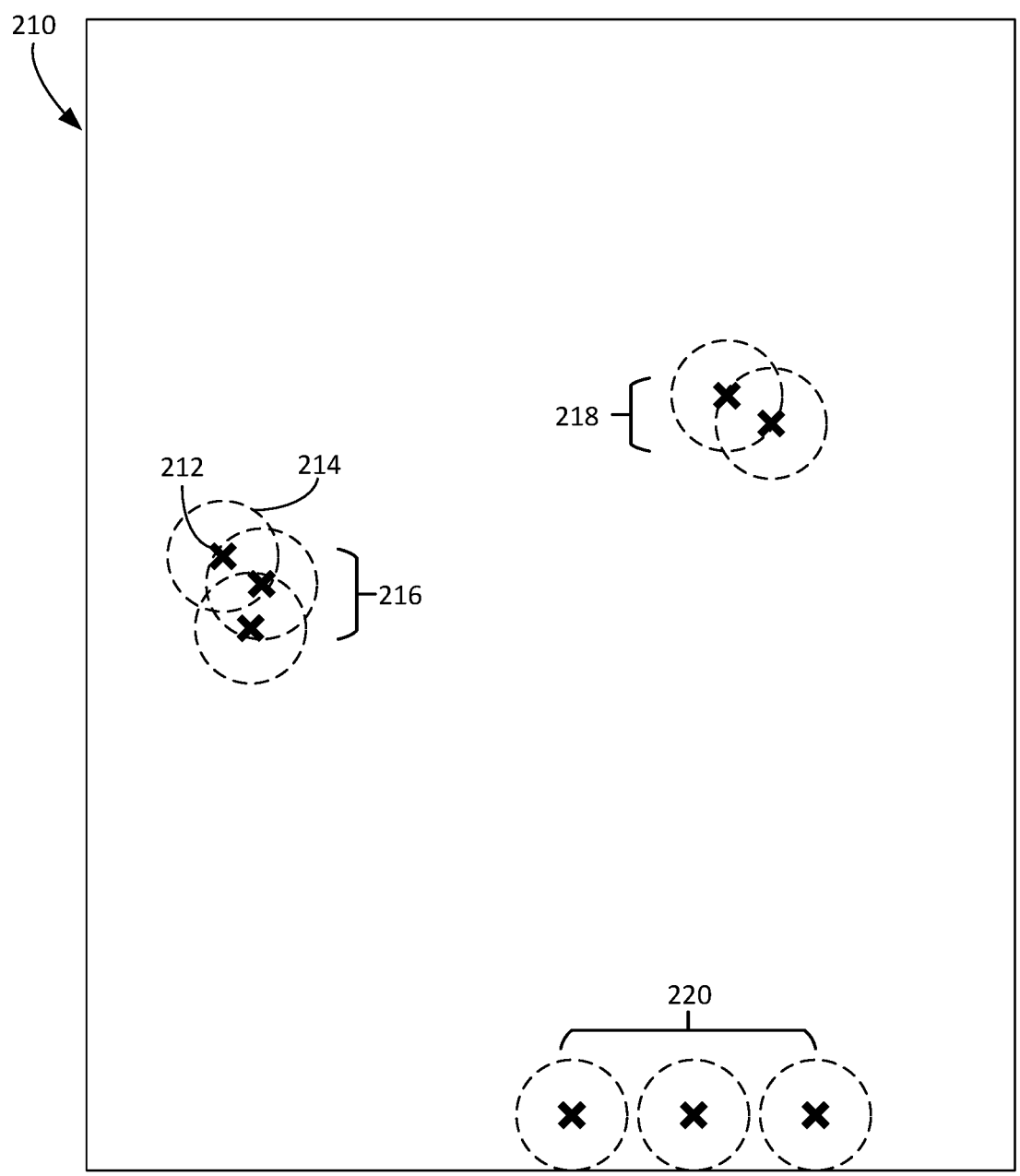
FIGS. 6A, 6B, and 7 are schematic top views of sensor events in an environment.
Figure 6B:
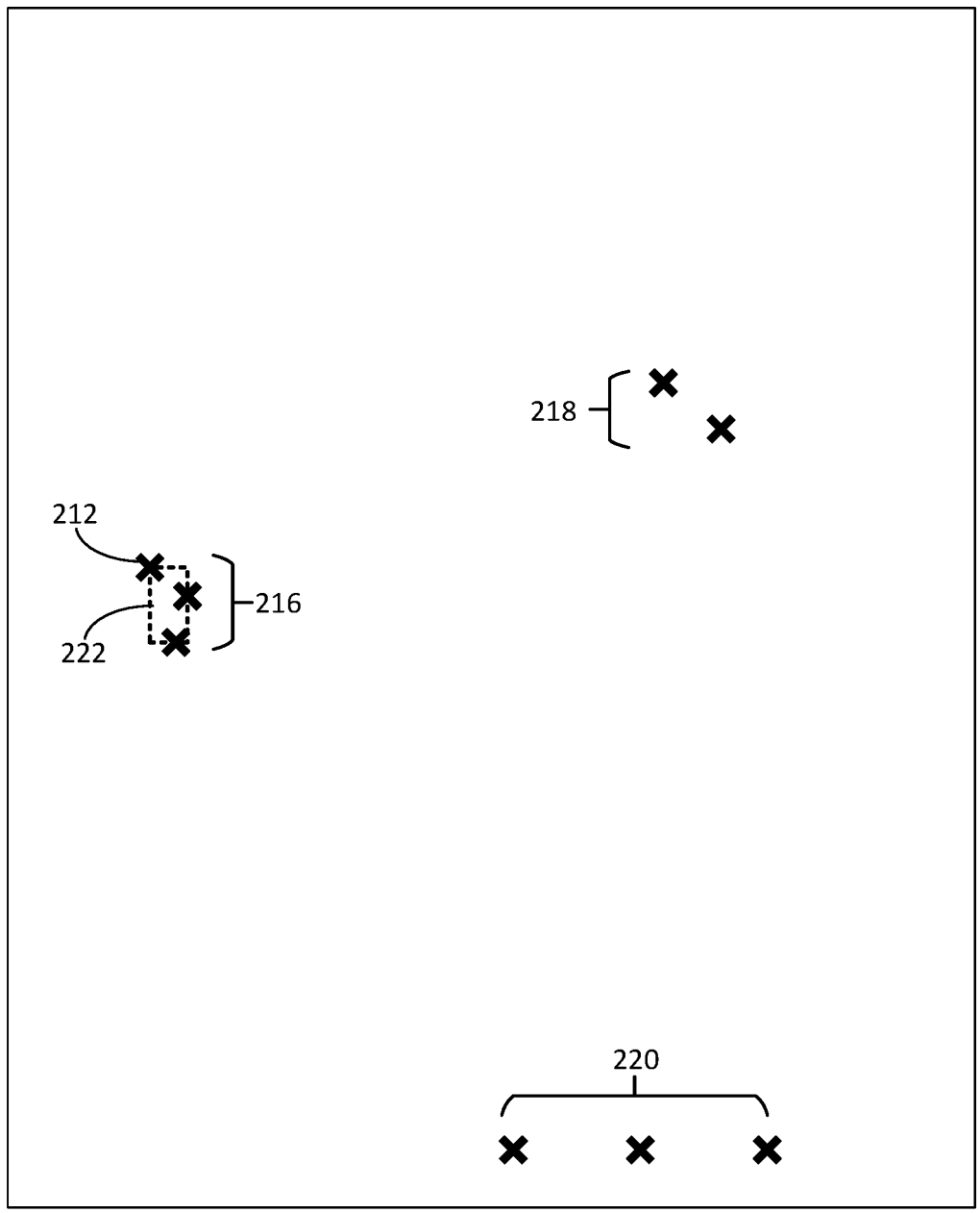
Figure 7:
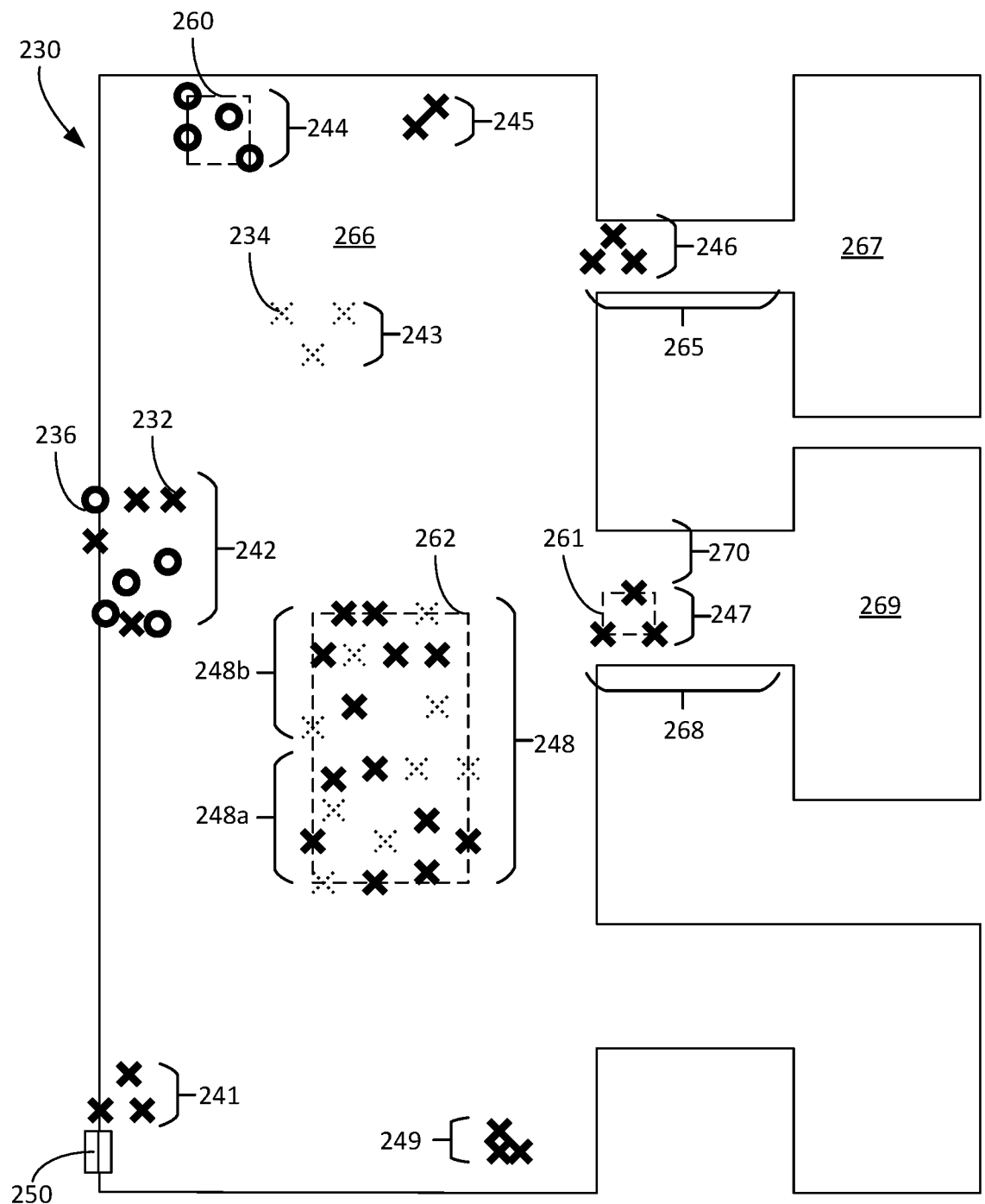

The criteria for, in the operation 202, identifying the sensor events 50 considered to be part of a subset used for recommending a behavior control zone can vary in implementations. FIGS. 6A, 6B, and 7 illustrate examples of subsets of sensor events that satisfy criteria for recommending a behavior control zone in accordance with the process 200.

Referring to FIG. 6A, an environment 210 in which sensor events 212 occurred is illustrated. To identify a subset of the sensor events 212 for recommending a behavior control zone, locations of the sensor events 212 are determined. FIG. 6A is a schematic representation of locations of these sensor events 212 within the environment 210. The subset of the sensor events 212 is identified based on a distance between two or more of the sensor events 212 within the subset. In some implementations, sensor events 212 are considered to be in a subset that can serve as the basis for recommending a behavior control zone if the sensor events 212 are no more than a threshold distance 214 apart from one another. For illustration purposes, only one of the sensor events 212 (represented as "X"-shaped marks) and only one of the threshold distances 214 are labeled (represented as dashed circles).

The criteria for identifying the subset of sensor events 212 for recommending a behavior control zone can vary in implementations. In some implementations, only one criterion is used to identify the subset of sensor events. The criterion can be a threshold distance criterion, a threshold amount criterion, or other appropriate criteria. In some implementations, multiple criteria are used to identify the subset of sensor events, e.g., two or more criteria.

In the example depicted in FIG. 6A, a cluster 216 of the sensor events 212 satisfies a threshold distance criterion. In particular, each sensor event 212 within the cluster 216 is no more than the threshold distance 214 from at least one other sensor event 212 within the cluster 216. A cluster 218 of the sensor events 212 also satisfies the threshold distance criterion, as the sensor events 212 in the cluster 218 are no more than the threshold distance 214 apart from one another. A cluster 220 of the sensor events 212 does not satisfy the threshold distance criterion. The sensor events 212 within the cluster 220 are spaced apart from one another by more than the threshold distance 214.

In some implementations, a cluster 216 of the sensor events 212 satisfies a threshold amount criterion. For example, in some implementations, the threshold amount criterion requires a cluster contain at a threshold amount of sensor events. For example, the threshold amount could be three sensor events 212. In other implementations, the threshold amount is four, five, six, or more sensor events. The cluster 216 includes three sensor events 212 and therefore satisfies the criterion requiring a cluster to contain at least three sensor events 212. The cluster 218 does not satisfy the threshold amount criterion, as the cluster 218 only contains two sensor events. The cluster 220 satisfies the sensor event amount criterion, as the cluster 220 contains three sensor events.

Referring to FIG. 6B, because only the cluster 216 satisfies both the threshold distance criterion and the threshold amount criterion, only the cluster 216 of the sensor events 212 is used for recommending a behavior control zone 222. The cluster 218 and the cluster 220 do not satisfy both these criteria and therefore are not used for recommending a behavior control zone.

The criteria used for recommending behavior control zone can vary in other implementations as well. Referring to FIG. 7, sensor events 232 (represented as solid "X"-shaped marks), sensor events 234 (represented as dashed "X"-shaped marks), and sensor events 236 (represented as circular marks) are triggered in an environment 230. Two types of sensor events occurred, with the sensor events 232 and the sensor events 234 being of the first type, and the sensor events 236 being of the second type. For example, the first type can be an obstacle detection sensor event, and the second type can be a debris detection sensor event. The sensor events 232 and the sensor events 234 differ in the order in which they occur. The sensor events 234 occur before the sensor events 232. For example, the sensor events 234 are triggered in a first mission of an autonomous mobile robot, and the second events 232 are triggered in a second mission of the autonomous mobile robot. The first mission is an earlier mission preceding the second mission.

In the environment, clusters 241-249 of sensor events are identified. The clusters 241-249 can include one type of sensor event or both types of sensor events.

The criteria for selecting the sensor events 232, 234, 236 considered to be part of a subset used for recommending a behavior control zone can include one or more of the criteria described with respect to FIGS. 6A and 6B. In some implementations, additional or alternative criteria can be used. For example, other criteria can include a dock proximity threshold criterion. In the example shown in FIG. 7, the cluster 241 of the sensor events 232 satisfies the threshold distance criterion and the threshold amount criterion. The cluster 241 does not, however, satisfy the dock proximity threshold criterion. A location of the cluster 241 is positioned a distance no more than a threshold distance from a location of a docking station 250 for the autonomous mobile robot. The location of the cluster 241 can correspond to any one of the locations of the sensor events 232 in the cluster 241, or can correspond to a value computed based on the locations of the sensor events 232 in the cluster 241, e.g., an average location or a centroid. Because the location of the cluster 241 is within the threshold distance from the location of the docking station, to avoid defining a behavior control zone that blocks the autonomous mobile robot from docking with the docking station 250, a behavior control zone is not recommended for the cluster 241 of the sensor events 212.

In some implementations, a criterion is satisfied based on whether a cluster including a first type of sensor event is near a second type of sensor event. If the cluster of the first type of sensor event is within a threshold distance or would define a behavior control zone that covers the second type of sensor event, a behavior control zone is not recommended. In the example depicted in FIG. 7, the cluster 242 includes the sensor events 232 as well as several of the sensor events 236. The cluster 242 of the sensor events 232 satisfies both the threshold distance criterion and the threshold amount criterion. But because the cluster 242 is within a threshold distance (which is distinct from the threshold distance for the threshold distance criterion) from at least one of the sensor events 236, the cluster 242 is not used as the basis for recommending a behavior control zone. For example, in implementations in which the sensor events 232 represent obstacle detection sensor events and the sensor events 236 represent debris detection sensor events, a behavior control zone for the obstacle detection sensor events is not recommended so that the autonomous mobile robot can enter the region containing the sensor events 232 to clean the debris within the region.

In some implementations, a timing criterion is satisfied based on the amount of time. In the example depicted in FIG. 7, the cluster 243 includes the sensor events 234, which are triggered at an earlier time than the sensor events 232 are triggered. In some implementations, an amount of time since the sensor events 234 occurred exceeds a threshold amount of time, and therefore does not satisfy the timing criterion. The threshold amount of time can be one day, two days, three days, or more days, or can be one week, two weeks, or more weeks. In some implementations, the timing criterion is satisfied based on the number of missions that have elapsed since the sensor events 234 occurred. An amount of missions since the sensor events 234 occurred exceeds a threshold amount of missions, and therefore does not satisfy the timing criterion. The threshold amount of missions can be one mission, two missions, three missions, or more missions. Because the timing criterion is not satisfied, the cluster 243 is not used for recommending a behavior control zone.

In some implementations, the threshold distance criterion and the threshold amount criterion are used regardless of the type of the sensor event in the cluster. For example, the cluster 244 includes only the sensor events 236. The threshold distance criterion and the threshold amount criterion can use the same threshold distance and the same threshold amount, respectively, as the threshold distance criterion and the threshold amount criterion for a cluster of the sensor events 232. In other implementations, threshold distances and threshold amounts can differ depending on a type of the sensor event. For example, a threshold distance for debris detection sensor events can be higher or lower than a threshold distance for obstacle detection sensor events. In the example depicted in FIG. 7, the cluster 244 of the sensor events 236 satisfies the relevant criteria for identifying a subset of sensor events for recommending a behavior control zone. Accordingly, a behavior control zone 260 is recommended. In examples in which the sensor events 236 are debris detection sensor events, the recommended behavior control zone 260 can cause the autonomous mobile robot to perform a focused clean behavior.

The cluster 245 of the sensor events 232 does not satisfy the threshold amount criterion. A behavior control zone is not recommended based on the cluster 245.

In some implementations, a criterion is satisfied based on whether a behavior control zone would block a path between a first region and a second region in the environment, thereby preventing the autonomous mobile robot from entering the region. In the example shown in FIG. 7, the cluster 246 of the sensor events 232 is positioned within a pathway 265 between a first room 266 and a second room 267. The cluster 246 satisfies the threshold distance criterion and the threshold amount criterion. But if a behavior control zone were created to cover the cluster 246 of the sensor events 232, such a behavior control zone would prevent the autonomous mobile robot from moving from the first room 266 to the second room 267 or would prevent the autonomous mobile robot from moving from the second room 267 to the first room 266.

In contrast, the cluster 247 of the sensor events 232 is positioned within a pathway 268 between the first room 266 and a third room 269. A behavior control zone 261 recommended based on the cluster 247 separates the first room 266 and the third room 269 and provides a traversable path 270 between the first room 266 and the third room 269. The traversable path 270 can have a width that is at least as wide as the autonomous mobile robot. In some implementations, to satisfy the criterion, the width of the traversable path 270 must have a width of at least one robot width, two robot widths, or more.

The cluster 248 includes both the sensor events 232 and the sensor events 234. The cluster 248 satisfies the threshold amount criterion and the threshold distance criterion. A recommended behavior control zone 262 is accordingly defined.

In some implementations, a criterion is satisfied based on whether a cluster contains sensor events over multiple missions within a period of time. In such implementations, the behavior control zone 261 and the behavior control zone 260 may not be recommended because the sensor events 232 and the sensor events 236 only occurred during a single mission. The behavior control zone 262 is nonetheless still recommended because the cluster 248 includes the sensor events 234 occurring during an earlier mission as well as the sensor events 232 occurring a later mission. The sensor data collected by the autonomous mobile robot and associated with the sensor events 232 and the sensor events 234 are collected during multiple missions and within a time period. A quantity of the multiple missions can be within a threshold quantity, e.g., two, three, or more missions. The time period can be within a threshold time period, e.g., one, two, three, or more days, months, or weeks.

In some implementations, instead of the cluster 248 being used as the basis for a recommended behavior control zone, two distinct clusters 248a, 248b are used as the basis for the recommended behavior control zone 262. Each cluster 248a, 248b independently satisfies the criteria for recommending a behavior control zone. The sensor events 232 in the cluster 248a and the sensor events 232 in the cluster 248b together, however, may not satisfy a certain criterion, e.g., the distance threshold criteria. For example, the closest sensor events 232 in the cluster 248a and in the cluster 248b may be separated by a distance greater than the distance threshold for the distance threshold criteria. As a result, two distinct behavior control zones are recommended, one being recommended for the cluster 248a, and another being recommended for the cluster 248b. In some implementations, if two or more recommended behavior control zones satisfy a behavior control zone separation criterion, the two or more recommended behavior control zones are combined with one another to form a single recommended behavior control zone. The resulting recommended behavior control zones for the clusters 248a, 248b, for example, can be separated by a distance no more than a threshold distance for the behavior control zone separation criterion. As a result, the recommended behavior control zones are combined with one another to form a single recommended behavior control zone, i.e., the recommended behavior control zone 262, covering both the cluster 248a and the cluster 248b.

As described herein, the distance threshold criterion is satisfied when the sensor events in a cluster are no more than a threshold distance. In some implementations, a minimum separation criterion is satisfied when the sensor events separated by at least a threshold distance distinct from the threshold distance for the distance threshold criterion. The threshold distance for the minimum separation criterion represents a lower bound for separation between sensor events, and the threshold distance for the distance threshold criterion represents an upper bound for separation between sensor events. In some implementations, the minimum separation criterion is satisfied when at least one of the sensor events in the subset is greater than the distance threshold for the minimum separation criterion. In the example shown in FIG. 7, the cluster 249 of the sensor events 232 are too close together. Each of the sensor events 232 in the cluster 249 is within the distance threshold of each of the other sensor events 232 in the cluster 249. Because the minimum separation criterion is not satisfied, a behavior control zone is not recommended based on the cluster 249 of the sensor events 232.

Returning to FIG. 5, the subset of the sensor events is identified at the operation 202 and then can be used to provide a recommendation for a behavior control zone. After the operation 202 is performed, at the operation 204, data indicative of a recommended behavior control zone is provided to a user computing device. The recommended behavior control zone can contain a subset of the locations associated with the subset of the sensor events. In particular, an area covered by the recommended behavior control zone can include the subset of the locations associated with the subset of the sensor events.

At the operation 206, a user-selected behavior control zone is defined in response to a user selection from the user computing device. The user-selected behavior control zone can be based on the recommended behavior control zone. For example, a user can operate the user computing device to provide the user selection. The user selection can be indicative of an acceptance of the recommended behavior control zone, a rejection of the recommended behavior control zone, or a modification of the recommended behavior control zone. In some implementations, the user selection corresponds to acceptance of the recommended behavior control zone such that the user-selected behavior control zone is identical to the recommended behavior control zone.

Definition of the user-selected behavior control zone can involve defining certain parameters of the user-selected behavior control zone. Parameters of the recommended behavior control zone, which are defined at the operation 204, can serve as a starting point for modification by the user to define parameters of the user-selected behavior control zone.

In some implementations, the definition of the user-selected behavior control zone can involve defining a geometric feature of the user-selected behavior control zone. For example, to define the user-selected behavior control zone, a perimeter of the user-selected behavior control zone, one or more dimensions of the user-selected behavior control zone, a shape of the user-selected behavior control zone, or other geometric feature of the user-selected behavior control zone can be defined. The geometric features of the recommended behavior control zone can be defined at the operation 204, and then the user can modify one or more of the geometric features of the recommended behavior control zone at the operation 206 to define the user-selected behavior control zone. For example, the user can modify a length or a width of the recommended behavior control zone to define a length or a width of the user-selected behavior control zone.

In some implementations, the definition of the user-selected behavior control zone can involve defining a specific behavior to be performed by the robot 100, or defining a behavior to be performed by another autonomous mobile robot operating the environment. In implementations in which only the robot 100 operates in the environment, the user can select which behavior the robot 100 performs in response to encountering or entering the user-selected behavior control zone. For example, the robot 100 can perform a movement behavior or a focused clean behavior. In implementations in which multiple autonomous mobile robots operate in the environment, the user can select different behaviors to be performed by different autonomous mobile robots, or can select that one or more of the autonomous mobile robots does not change behavior in response to encountering or entering the behavior control zone. In some examples, a first of the autonomous mobile robots performs a focused clean behavior in the behavior control zone, while a second of the autonomous mobile robots performs a movement behavior to avoid the behavior control zone.

In some implementations, the definition of the user-selected behavior control zone can involve defining a schedule for the behavior control zone. The recommended behavior control zone defined at the operation 204 may be defined to be active at all time, for all missions performed by the robot 100. A user may not wish to have the user-selected behavior control zone active for at least some of the missions to be performed by the robot 100. The schedule can indicate a mission or missions that the user-selected behavior control zone is active, or can indicate a time period in which the user-selected behavior control zone is active. For example, the user-selected behavior control zone may be defined such that the user-selected behavior control zone is only active during missions that occur during working hours, during mornings and afternoons, during certain days of the week, or during certain months. Alternatively, the schedule may also be situationally controlled, such that the user-selected behavior control zone may only be active when certain conditions are met. For example, the user-selected behavior control zone may be defined to be only active when no human occupants of the environment are present, when human occupants are not in the vicinity of the location of the behavior control zone, when a pet is not in the vicinity of the location of the behavior control zone, when the robot 100 has a battery level exceeding a certain threshold, or when another condition related to the robot 100 or the environment is satisfied.

The operations 202, 204, 206 of the process 200 can be performed, as described herein, by one or more computing devices in the communication network 185. For example, the remote computing system 192 (shown in FIG. 4) can perform each of the operations 202, 204, 206, and then the robot 100 can access data for the user-selected behavior control zone so that, during a mission, the robot 100 can be controlled in accordance with the user-selected behavior zone. In some implementations, the robot 100 performs each of the operations 202, 204, 206, and in some implementations, the user computing device 188 performs each of the operations 202, 204, 206. In some implementations, two or more of the devices in the communication network 185 work together to perform one or more of the operations 202, 204, 206. In some implementations, different devices in the communication network 185 perform different operations of the process 200.

Figure 8:
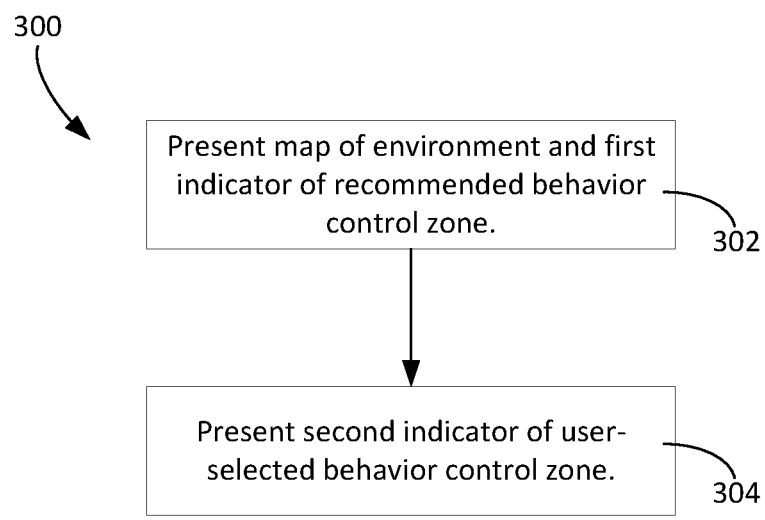
FIG. 8 is a flowchart of a process of presenting a map and indicator for behavior control zones on a user computing device.

FIG. 8 illustrates a flowchart of an example method for presenting a visual representation of a recommended behavior control zone and a user-selected behavior control zone to a user. A map of an environment of the robot 100 can be visually represented, and then an indicator of the recommended behavior control zone and an indicator of the user-selected behavior control zone can be overlaid on the map. This method is described with respect to control of the robot 100 described herein. In other implementations, other types of autonomous mobile robot may be controlled by defining a behavior control zone in accordance with implementations of the method shown in FIG. 8.

Referring to FIG. 8, a process 300 includes operations 302 and 304. The process 300 is used to present indicators of recommended and user-selected behavior control zones to provide a user with a visual representation of geometric features of the behavior control zones within the environment of the robot 100.

Figure 9:
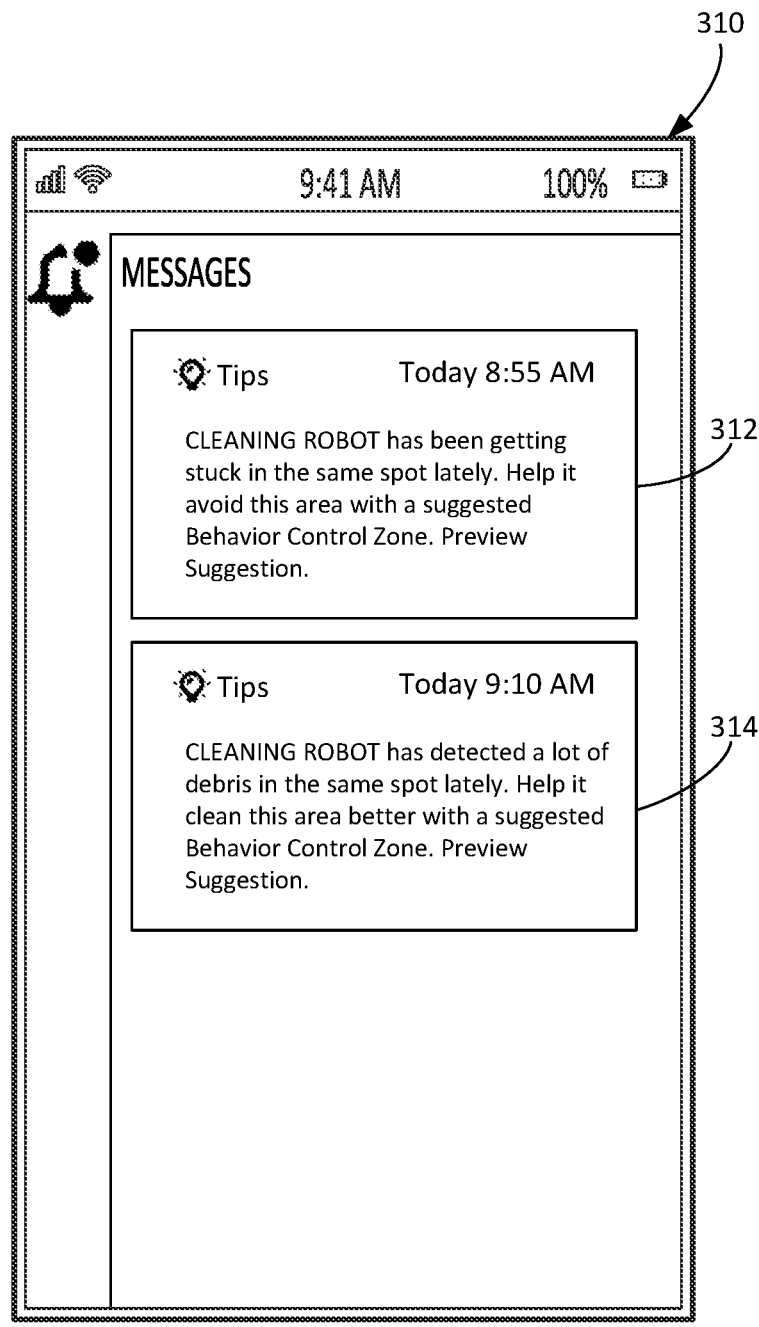
FIG. 9 is an illustration of a user interface presenting a notification for recommending a behavior control zone.

In some implementations, before the operations 302 and 304 are performed, a notification can be transmitted on the user computing device 188 to notify the user that a behavior control zone is recommended. For example, referring to FIG. 9, a user interface 310 for a user computing device, e.g., the user computing device 188, presents a notification 312 indicating that a behavior control zone is recommended. The notification 312 indicates that the robot 100 has been getting stuck in the same spot lately, e.g., due to obstacles in the vicinity of the spot detected by obstacle detection sensors of the robot 100. The user interface 310 further presents a notification 314 indicating that another behavior control zone is recommended. The notification 314 indicates that the robot 100 has detected a lot of debris in the same spot lately, e.g., due to debris in the vicinity of the spot detected by debris sensors of the robot 100. The user can operate the user interface 310 to initiate definition of a behavior control zone in response to the notifications 312, 314.

Referring back to FIG. 8, in response to a command from the user to initiate definition of the behavior control zone, the user interface may present visual representations of the environment to aid in defining the behavior control zone. At the operation 302, a map of the environment and a first indicator of the recommended behavior control zone is presented. For example, referring to FIG. 10A, a map 316 and a first indicator 318 are visually presented to the user on the user interface 310 of the user computing device. The visual presentation of the map 316 and the first indicator 318 can allow the user to visualize where the recommended behavior control zone would be situated within the environment.

The map 316 can be a visual representation of a floor plan of the environment, e.g., the environment shown in FIG. 1. The map 316 can be generated based on mapping data collected by the robot 100 as the robot 100 moves about the environment. A recommended behavior control zone (indicated by the first indicator 318) can be generated based on sensor data collected by the robot 100 (shown in FIG. 1). For example, the recommended behavior control zone can be generated using the process 200 described herein, e.g., the operations 202 and 204. The first indicator 318 can be overlaid on the map to indicate a location of the recommended behavior control zone in the environment. Furthermore, the first indicator 318 can indicate geometric features of the recommended behavior control zone, such as a perimeter, a shape, or one or more dimensions of the recommended behavior control zone. The first indicator 318 is also positioned relative to the map 316 to indicate a location of the recommended behavior control zone in the environment.

In some implementations, information about a geometric feature of the first indicator 318 is also presented on the user interface 310. For example, dimensions 330a, 330b are presented on the user interface 310 to indicate a width and a length of the recommended behavior control zone. In some implementations, other geometric features may be indicated. For example, a perimeter length, a side length, an angle between sides, an area, or other geometric measurements of the recommended behavior control zone may be presented on the user interface 310. In addition, the first indicator 318 shows that the recommended behavior control zone is rectangular. In other implementations, the recommended behavior control zone may have other shapes, including polygonal shapes, circular shapes, triangular shapes, or other shapes.

At the operation 304, a second indicator of a user-selected behavior control zone is presented on the user interface of the user computing device. For example, referring to FIG. 10B, the map 316 and a second indicator 320 of a user-selected behavior control zone are presented on the user interface 310. The second indicator 320 can be overlaid on the map 316.

Furthermore, the second indicator 320 can indicate geometric features of the user-selected behavior control zone, such as a perimeter, a shape, or one or more dimensions of the user-selected behavior control zone. The second indicator 320 is also positioned relative to the map 316 to indicate a location of the user-selected behavior control zone in the environment.

In some implementations, information about a geometric feature of the second indicator 320 is also presented on the user interface 310. For example, dimensions 332a, 332b are presented on the user interface 310 to indicate a width and a length of the recommended behavior control zone. In some implementations, other geometric features may be indicated. For example, a perimeter length, a side length, an angle between sides, an area, or other geometric measurements of the recommended behavior control zone may be presented on the user interface 310. In addition, the first indicator 318 shows that the recommended behavior control zone is rectangular. In other implementations, the recommended behavior control zone may have other shapes, including polygonal shapes, circular shapes, triangular shapes, or other shapes.

Figure 10A:
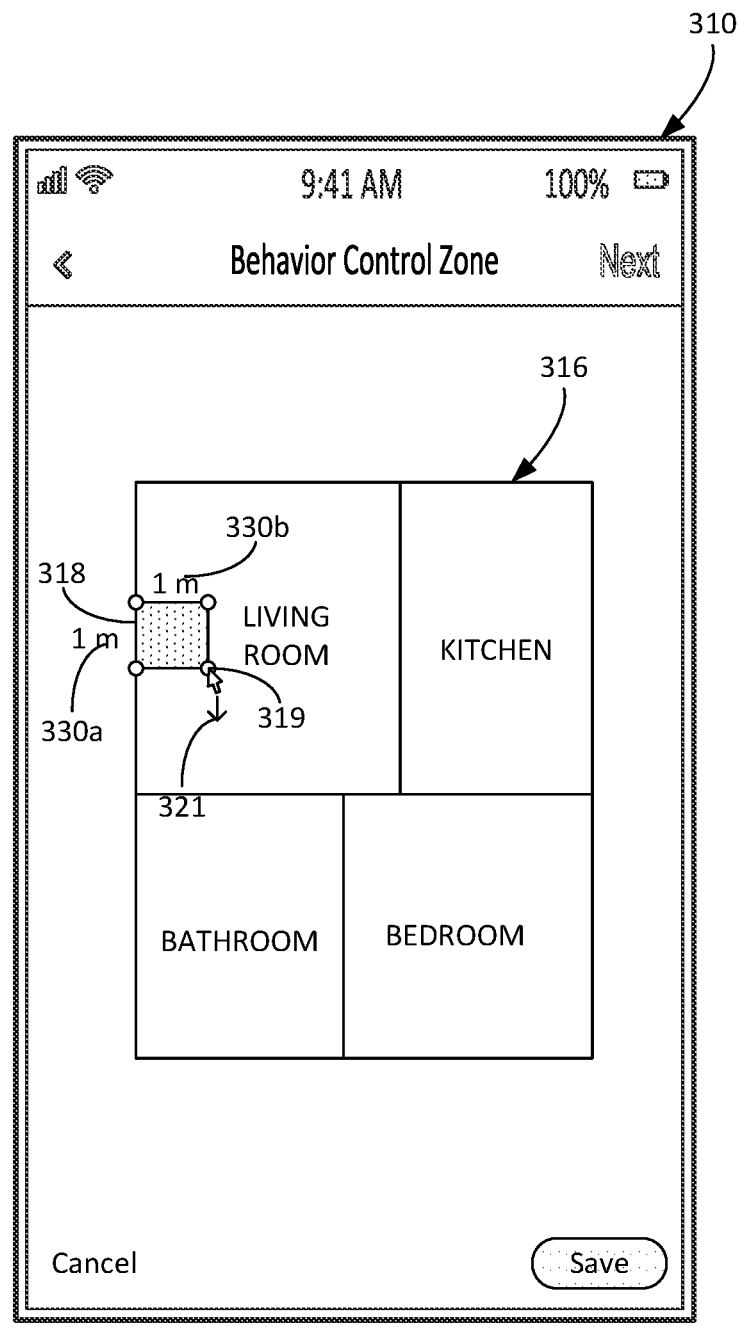
FIGS. 10A and 10B are illustrations of user interfaces presenting maps and indicators of behavior control zones overlaid on the maps.

The second indicator 320 of the user-selected behavior control zone is presented based on the recommended behavior control zone and a user-selected modification of the recommended behavior control zone represented by the first indicator 318 in FIG. 10A. The second indicator 320 thus represents a user selection of a behavior control zone based on the recommended behavior control zone. Referring to FIG. 10A, the user can interact with the user interface 310 and adjust the recommended behavior control zone represented by the first indicator 318. For example, the user can operate a user input device, e.g., a touchscreen, a mouse, trackpad, or other user input device, and make the user-selected modification of the shape, the size, the length, the width, or other geometric feature of the recommended behavior control zone. In the example shown in FIG. 10A, if the user interface 310 includes a touchscreen, the user can touch a corner 319 of the first indicator 318 and drag in a downward direction 321 to resize the recommended behavior control zone. Such resizing produces the user-selected behavior control zone represented by the second indicator 320.

Figure 10B:
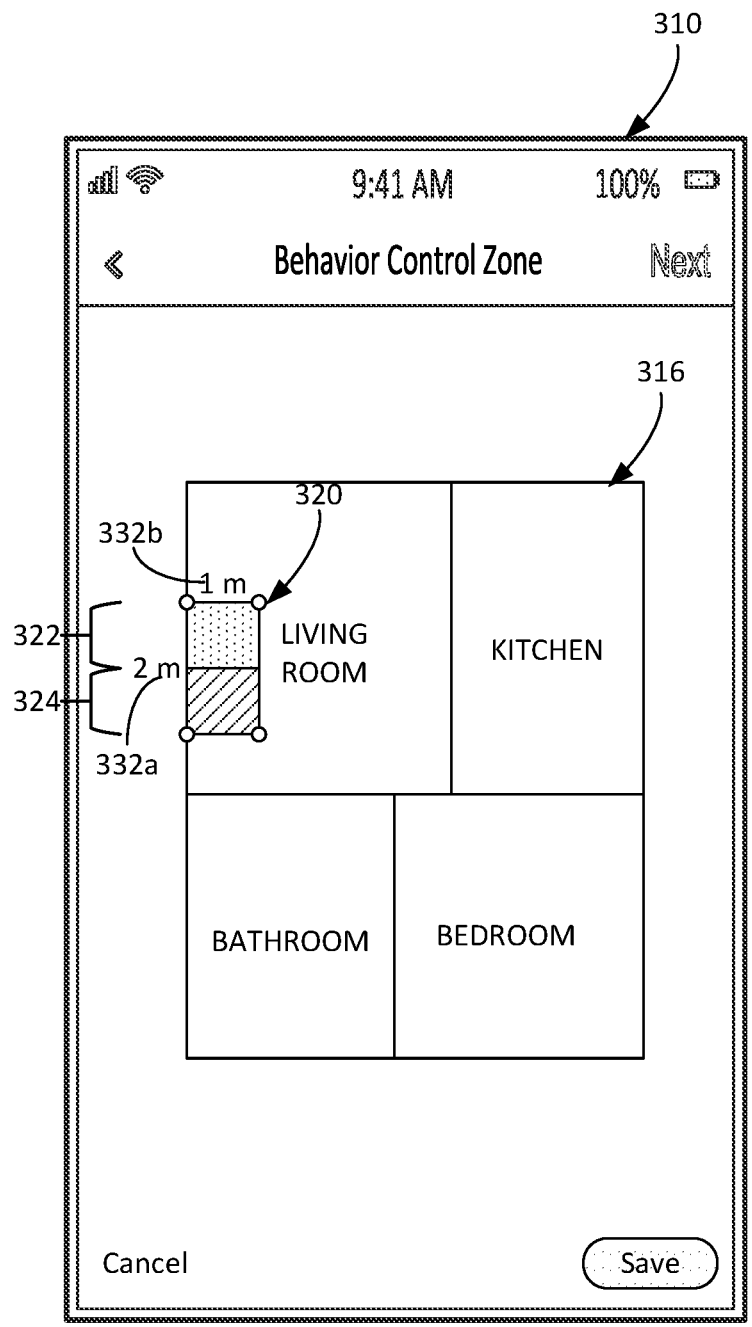

As the user makes changes to the recommended behavior control zone, the second indicator 320 shown in FIG. 10B can indicate the change relative to the first indicator 318 shown in FIG. 10A and thus provide a means of comparison between the recommended behavior control zone and the user-selected behavior control zone. In the example shown in FIG. 10B, the second indicator 320 includes a first portion 322 and a second portion 324. The first portion 322 is indicative of the recommended behavior control zone and has geometric features corresponding to geometric features of the first indicator 318 shown in FIG. 10A. The second portion 324 is indicative of the user-selected modification of the recommended behavior control zone and accordingly represents a difference between the recommended behavior control zone and the user-selected behavior control zone.

The first and second portions 322, 324 of the second indicator 320 can be distinguished from one another through various visual features presented on the user interface 310. In the example depicted in FIG. 10B, the first portion 322 has a first shading style, and the second portion 324 has a second shading style distinct from the first shading style. In some implementations, the first portion 322 and the second portion 324 have distinct colors. In some implementations, rather than showing first and second portions 322, 324 of the second indicator 320 to indicate the modification of the recommended behavior control zone, the second indicator 320 is overlaid on the first indicator 318. The second indicator 320 can be a transparent layer to allow the first indicator 318 to be visible through the second indicator 320. The user can thus see both the first indicator 318 and the second indicator 320 and visually compare the recommended behavior control zone and the user-selected behavior control zone by viewing both the first indicator 318 and the second indicator 320 at the same time.

Figure 11:
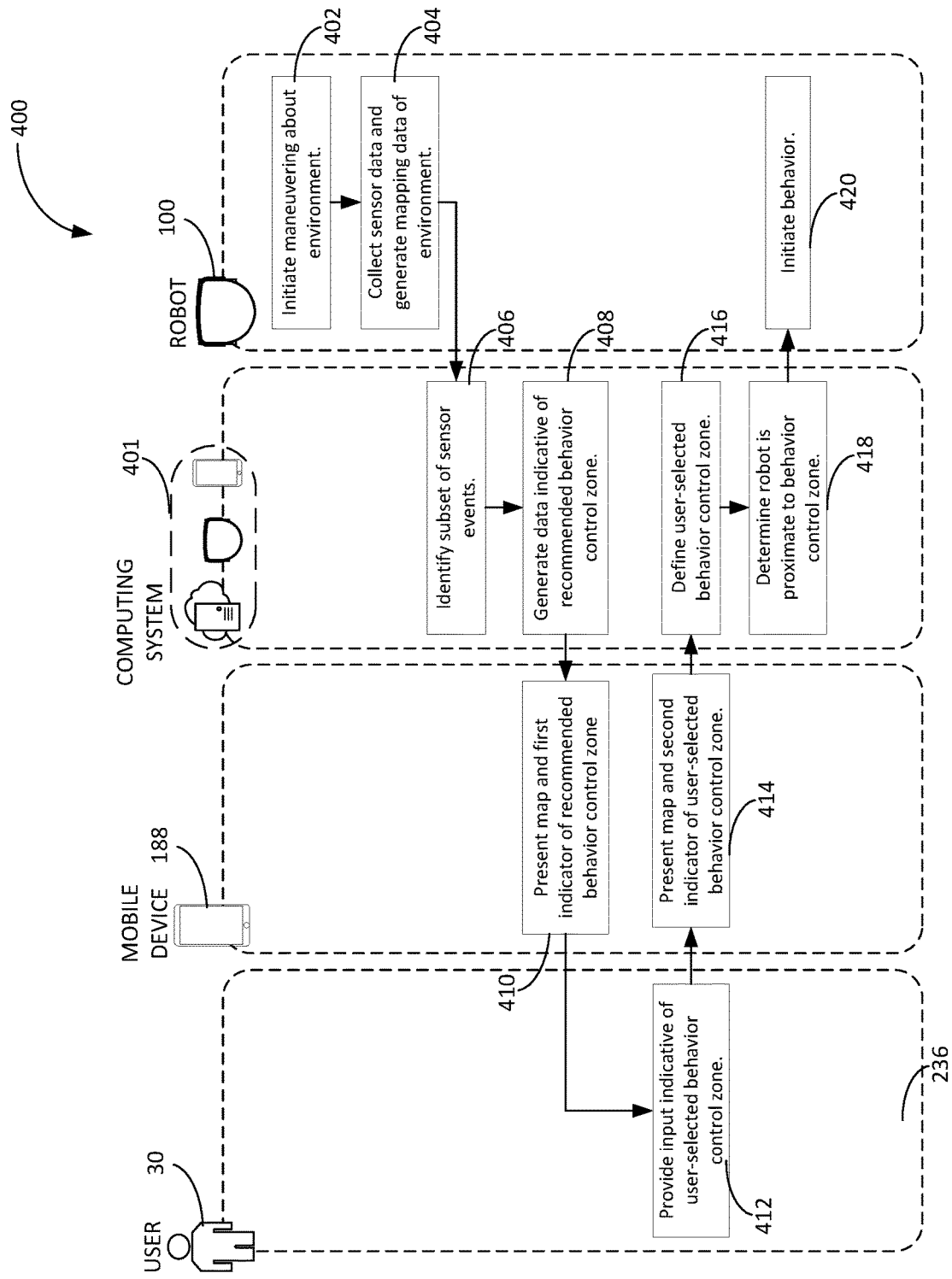
FIG. 11 is a flowchart of a process of defining a behavior control zone, presenting a visual representation of the behavior control zone, and controlling an autonomous mobile robot using the behavior control zone.

Referring to FIG. 11, a process 400 for provided a recommended behavior control zone, defining a user-selected behavior control zone, and controlling the robot 100 based on the user-selected behavior control zone is illustrated. At an operation 402, the robot 100 initiates maneuvering about the environment. At the operation 404, the robot 100 collects sensor data and generates mapping data of the environment as the robot 100 maneuvers about the environment. The mapping data can be generated based on the sensor data. The mapping data can be indicative of the sensor data and location data associated with the sensor data.

The mapping data can be used for identifying a subset of sensor events for generating a recommended behavior control zone at an operation 406. The operation 406 can be similar to the operation 202 described with respect to FIG. 5. The operation 406 can be performed by a computing system 401. The computing system 401 can be a controller located on the robot 100 or located on the user computing device 188. Alternatively, the computing system 401 can be a remote computing system (e.g., the remote computing system 192). In some implementations, the computing system 401 is a distributive computing system that includes processors located on multiple devices, e.g., the robot 100, the user computing device 188, or the remote computing system 192. In some implementations, the computing system 401 can include processors on autonomous mobile robots in addition to the robot 100.

At an operation 408, data indicative of a recommended behavior control is generated and provided to the user computing device 188. The operation 408 is similar to the operation 204 described with respect to FIG. 5.

At an operation 410, the user computing device 188 presents a map and a first indicator of the recommended behavior control zone. The operation 410 is similar to the operation 302 described with respect to FIG. 8. At an operation 412, the user 30 provides an input indicative of a user-selected behavior control zone. For example, the user 30 can operate the user computing device 188 in the manner described with respect to FIGS. 9A and 9B to provide a user-selected modification of the recommended behavior control zone.

At an operation 414, the user computing device 188 presents the map and a second indicator of the user-selected behavior control zone. The operation 414 is similar to the operation 304 described with respect to FIG. 8. An example of the map and the second indicator is shown in FIG. 9B as described herein.

At an operation 416, the user-selected behavior control zone is defined by the computing system 401. The operation 416 is similar to the operation 206 as described with respect to FIG. 5. At an operation 418, the computing system 401 determines that the robot 100 is proximate to the user-selected behavior control zone or is within the user-selected behavior control zone. And at an operation 420, the robot 100 initiates a behavior associated with the user-selected behavior control zone. The behavior can vary in implementations as described herein.

Additional Alternative Implementations

FIGS. 10A and 10B describe that the user interface 310 presents visual information for the user. The user interface 310 can vary in implementations. The user interface 310 can be an opaque display or a transparent display. In the implementation shown in FIG. 4, the user computing device 188 can include an opaque display that can visually present the map as an image viewable on the display. In some implementations, the user computing device 188 can include a transparent display that allows the display to present a virtual reality representation of the map and indicators overlaid on the map.

The robot 100 depicted in FIGS. 2 and 3A-3B is a floor cleaning robot. In particular, the robot 100 is a vacuum cleaning robot that moves about the floor surface 10 and ingests debris as the robot 100 moves over debris on the floor surface 10. The type of the robot can vary in implementations. In some implementations, the robot is a floor cleaning robot that uses a cleaning pad moved along the floor surface to collect debris on the floor surface. The robot can include a fluid application device, such as a spraying device, that applies fluid, such as water or a cleaning solution including detergent, to the floor surface to loosen debris on the floor surface. The cleaning pad of the robot can absorb the fluid as the robot moves along the floor surface. In addition to the uses of behavior control zones described herein, when the robot is a wet cleaning robot, the behavior control zones can be used to control other parameters the robot. For example, the behavior control zones can be used to control a fluid application pattern of the robot. The robot may spray the fluid at a certain rate as the robot moves across the floor surface. When the robot encounters or enters into the behavior control zone, the rate at which the robot sprays the fluid may change. Such a behavior control zone may be recommended in response to sensor events indicating a change in floor surface type.

In some implementations, a patrol robot with an image capture device can be used. The patrol robot can include mechanisms to move the image capture device relative to a body of the patrol robot. When the robot is a patrol robot, the behavior control zones can be used to control parameters of the robot in addition to those described herein.

While the robot 100 is described as a circular robot, in other implementations, the robot 100 can be a robot including a front portion that is substantially rectangular and a rear portion that is substantially semicircular. In some implementations, the robot 100 has an outer perimeter that is substantially rectangular.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

Operations associated with implementing all or part of the robot operation and control described herein can be performed by one or more programmable processors executing one or more computer programs to perform the functions described herein. For example, the mobile device, a cloud computing system configured to communicate with the mobile device and the autonomous cleaning robot, and the robot's controller may all include processors programmed with computer programs for executing functions such as transmitting signals, computing estimates, or interpreting signals. A computer program can be written in any form of programming language, including compiled or interpreted languages, and it can be deployed in any form, including as a stand-alone program or as a module, component, subroutine, or other unit suitable for use in a computing environment.

The controllers and mobile devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The robot control and operating techniques described herein may be applicable to controlling other mobile robots aside from cleaning robots. For example, a lawn mowing robot or a space-monitoring robot may be trained to perform operations in specific portions of a lawn or space as described herein.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

A number of implementations have been described. Nevertheless, it will be understood that various modifications may be made. Accordingly, other implementations are within the scope of the claims.

What is claimed is:

1. A method comprising:
   receiving, at a user device, mapping data indicative of a map of an environment, the mapping data collected by an autonomous mobile robot as the autonomous mobile robot moves about the environment; and
   responsive to user interaction with the mapping data, defining, at the user device,
      a behavior control zone representing only a portion of the environment, the behavior control zone defined with a geometrical boundary in the mapping data,
      a behavior defined with respect to the behavior control zone, and
      at least one condition defined with respect to the behavior control zone, wherein, upon the at least one condition being satisfied, the behavior control zone is caused to be active, such that, when the at least one condition is satisfied, the autonomous mobile robot initiates the behavior in response to encountering the behavior control zone,
      wherein the behavior comprises a focused clean behavior in which the behavior control zone receives an enhanced level of cleaning, or a movement behavior, and
      wherein the at least one condition comprises at least one of a condition of the environment or a condition of the autonomous mobile robot.

2. The method of claim 1, wherein the at least one condition comprises the condition of the environment.

3. The method of claim 2, wherein the condition of the environment is based on a presence or non-presence of an occupant of the environment.

4. The method of claim 3, wherein the condition of the environment comprises that the behavior control zone is active when a human or pet is not in a vicinity of the behavior control zone.

5. The method of claim 1, wherein the at least one condition comprises the condition of the autonomous mobile robot.

6. The method of claim 5, wherein the condition of the autonomous mobile robot is based on a battery level of the autonomous mobile robot.

7. The method of claim 1, wherein the behavior is a first behavior, wherein the autonomous mobile robot is a first autonomous mobile robot, and wherein the method comprises defining, responsive to a second user interaction with the mapping data, at the user device, a second behavior for a second autonomous mobile robot, the second behavior different from the first behavior, wherein the second autonomous mobile robot initiates the second behavior in response to encountering the behavior control zone.

8. The method of claim 7, wherein the second behavior comprises a cleaning behavior, and the first behavior comprises an avoidance behavior.

9. The method of claim 1, comprising defining that a second autonomous mobile robot does not change behavior in response to encountering the behavior control zone.

10. The method of claim 1, wherein the mapping data indicates a plurality of sensor events detected in the behavior control zone by the autonomous mobile robot, the plurality of sensor events having a common event type, wherein the method comprises recommending the behavior control zone at the user device based on the plurality of sensor events.

11. The method of claim 10, wherein the common event type comprises a wheel drop event, in which a drive wheel of the autonomous mobile robot extends from the autonomous mobile robot beyond a threshold distance.

12. The method of claim 10, wherein the common event type comprises a wheel slip event, in which a drive wheel of the autonomous mobile robot loses traction with a floor surface across which the autonomous mobile robot moves.

13. The method of claim 10, wherein the common event type comprises a wedge event, in which the autonomous mobile robot is wedged between an obstacle above the autonomous mobile robot and a floor surface.

14. The method of claim 1, wherein defining the behavior control zone is based on a user-selected modification of a recommended behavior control zone.

15. The method of claim 1, comprising:
defining, responsive to a second user interaction with the mapping data, at the user device,
a second behavior control zone, wherein the second behavior control zone represents a portion of the environment different from the portion of the environment represented by the behavior control zone, and
at least one second condition defined with respect to the second behavior control zone, wherein upon the at least one second condition being satisfied, the second behavior control zone is caused to be active, such that, when the at least one second condition is satisfied, the autonomous mobile robot initiates a second behavior in response to encountering the second behavior control zone,
wherein the at least one second condition is different from the at least one condition for the behavior control zone.

16. The method of claim 1, wherein the at least one condition differs from at least one second condition defined with respect to with a second behavior control zone, wherein the second behavior control zone represents a portion of the environment different from the portion of the environment represented by the behavior control zone,
wherein the at least one second condition comprises at least one of a condition of the environment or a condition of the autonomous mobile robot, and
upon the at least second condition being satisfied, the second behavior control zone is caused to be active, such that, when the at least one second condition is satisfied, the autonomous mobile robot initiates a second behavior in response to encountering the second behavior control zone, wherein the second behavior comprises a focused clean behavior in which the second behavior control zone receives an enhanced level of cleaning, or a movement behavior, and wherein the second behavior differs from the behavior.

17. The method of claim 1, wherein the behavior comprises the movement behavior, and wherein the movement behavior comprises a movement pattern within the behavior control zone, a movement speed within the behavior control zone, movement along a perimeter of the behavior control zone, or movement to escape the behavior control zone.

18. The method of claim 1, wherein the behavior comprises the focus clean behavior, and wherein the focus clean behavior comprises a suction power, a movement speed within the behavior control zone, a brush rotation speed, a rotatable member movement speed, or a movement pattern within the behavior control zone.

19. A system comprising:
one or more processors, and
one or more non-transitory machine-readable storage media storing instructions that, when executed by the one or more processors, cause the one or more processors to perform operations comprising:
receiving, at a user device, mapping data indicative of a map of an environment, the mapping data collected by an autonomous mobile robot as the autonomous mobile robot moves about the environment; and
responsive to user interaction with the mapping data, defining, at the user device,
a behavior control zone representing only a portion of the environment, the behavior control zone defined with a geometrical boundary in the mapping data,
a behavior defined with respect to the behavior control zone, and
at least one condition defined with respect to the behavior control zone, wherein, upon the at least one condition being satisfied, the behavior control zone is caused to be active, such that, when the at least one condition is satisfied, the autonomous mobile robot initiates the behavior in response to encountering the behavior control zone,
wherein the behavior comprises a focused clean behavior in which the behavior control zone receives an enhanced level of cleaning, or a movement behavior, and
wherein the at least one condition comprises at least one of a condition of the environment or a condition of the autonomous mobile robot.

20. The system of claim 19, wherein the at least one condition comprises the condition of the environment.

21. The system of claim 19, wherein the behavior is a first behavior, wherein the autonomous mobile robot is a first autonomous mobile robot, and
wherein the operations comprise defining, responsive to a second user interaction with the mapping data, at the user device, a second behavior for a second autonomous mobile robot, the second behavior different from the first behavior,
wherein the second autonomous mobile robot initiates the second behavior in response to encountering the behavior control zone.

* * * * *

UNITED STATES PATENT AND TRADEMARK OFFICE
CERTIFICATE OF CORRECTION

PATENT NO. : 12,210,360 B2  
APPLICATION NO. : 17/934782  
DATED : January 28, 2025  
INVENTOR(S) : Shipra Arora et al.

Page 1 of 1

It is certified that error appears in the above-identified patent and that said Letters Patent is hereby corrected as shown below:

In the Claims

Column 29, Line 57, Claim 16 – after "respect to" delete "with".

Column 29, Line 64, Claim 16 – after "at least" insert -- one --.

Signed and Sealed this  
Sixteenth Day of September, 2025

Coke Morgan Stewart  
*Acting Director of the United States Patent and Trademark Office*